(12) United States Patent
Suzuki et al.

(10) Patent No.: US 9,264,197 B2
(45) Date of Patent: *Feb. 16, 2016

(54) RADIO COMMUNICATION SYSTEM, MOBILE STATION APPARATUS, BASE STATION APPARATUS, RADIO COMMUNICATION METHOD, AND INTEGRATED CIRCUIT

(71) Applicant: SHARP KABUSHIKI KAISHA, Osaka-shi, Osaka (JP)

(72) Inventors: Shoichi Suzuki, Osaka (JP); Wataru Ouchi, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,385

(22) Filed: Jun. 29, 2015

(65) Prior Publication Data

US 2015/0304084 A1 Oct. 22, 2015

Related U.S. Application Data

(63) Continuation of application No. 13/520,960, filed as application No. PCT/JP2010/073409 on Dec. 24, 2010, now Pat. No. 9,100,924.

(30) Foreign Application Priority Data

Jan. 8, 2010 (JP) ................................. 2010-002760

(51) Int. Cl.
*H04B 7/00* (2006.01)
*H04L 5/00* (2006.01)
*H04W 52/24* (2009.01)

(52) U.S. Cl.
CPC ............ *H04L 5/0048* (2013.01); *H04W 52/248* (2013.01)

(58) Field of Classification Search
USPC ......................................................... 455/522
See application file for complete search history.

(56) References Cited

U.S. PATENT DOCUMENTS

2010/0103867 A1* 4/2010 Kishiyama .......... H04W 52/146
370/320
2013/0012252 A1 1/2013 Suzuki et al.

FOREIGN PATENT DOCUMENTS

JP 2011-142550 A 7/2011
WO WO 2008/084700 A1 7/2008

OTHER PUBLICATIONS

3GPP TS 36.213 V9.0.1 (Dec. 2009); 3rd Generation Partnership Project; Technical Specification Group Radio Access Network; Evolved Universal Terrestrial Radio Access (E-UTRA); Physical layer Procedures (Release 9), Valbonne, France, pp. 1-79.

(Continued)

*Primary Examiner* — Ankur Jain
(74) *Attorney, Agent, or Firm* — Birch, Stewart, Kolasch & Birch, LLP

(57) ABSTRACT

A mobile station apparatus receives a radio resource control signal including at least a first parameter $P_{OFFSET}(0)$ and a second parameter $P_{OFFSET}(1)$. The mobile station apparatus also transmits a first reference signal on a first antenna port and a second reference signal on a second antenna port. In addition, the mobile station apparatus sets a first transmit power for a transmission of the first reference signal based on at least the first parameter $P_{OFFSET}(0)$, a maximum transmit power value, a path loss and a transmission power control command. The mobile station apparatus also sets a second transmit power for a transmission of the second reference signal based on at least the second parameter $P_{OFFSET}(1)$, a maximum transmit power value, a path loss and a transmission power control command.

8 Claims, 10 Drawing Sheets

(56) References Cited

OTHER PUBLICATIONS

Nokia Siemens Networks, Nokia, "Channel sounding enhancements for LTE-Advanced", 3GPP TSG RAN WG1 Meeting #59, R1-094653, Nov. 9-13, 2009.

Texas Instruments, "Sounding Reference Signal in Support of Scheduling Request in E-UTRA", 3GPP TSG RAN WG1 #52, R1-080700, pp. 1-7, Feb. 11-15, 2008.

U.S. Notice of Allowance issued in U.S. Appl. No. 13/520,960 on Mar. 20, 2015.

* cited by examiner

RADIO COMMUNICATION SYSTEM, MOBILE STATION APPARATUS, BASE STATION APPARATUS, RADIO COMMUNICATION METHOD, AND INTEGRATED CIRCUIT

This application is a Continuation of U.S. application Ser. No. 13/520,960 filed on Aug. 10, 2012, for which priority is claimed under 35 U.S.C. §120, application Ser. No. 13/520,960 is the national phase of PCT International Application No. PCT/JP2010/073409 filed on Dec. 24, 2010 under 35 U.S.C. §371, which claims the benefit of priority of JP2010-002760 filed Jan. 8, 2010. The entire contents of each of the above-identified applications are hereby incorporated by reference.

TECHNICAL FIELD

The present invention relates to a radio communication system, abase station apparatus, a mobile station apparatus, a radio communication method, and an integrated circuit in which the mobile station apparatus transmits a reference signal for measuring an uplink channel (an SRS (Sounding Reference Signal)) to the base station apparatus.

BACKGROUND ART

Conventionally, in 3GPP (3rd Generation Partnership Project), a radio access system and a radio network which achieve higher-speed data communication (hereinafter referred to as "LTE-A (Long Term Evolution-Advanced)" or "A-EUTRA (Advanced Evolved Universal Terrestrial Radio Access)".) have been discussed utilizing evolution of a radio access system and a radio network of cellular mobile communication (hereinafter referred to as "LTE (Long Term Evolution)" or "SUTRA (Evolved Universal Terrestrial Radio Access)"), and a more broadband frequency band than the LTE.

In the LTE, an OFDM (Orthogonal Frequency Division Multiplexing) system, which is multicarrier transmission, is used as a communication system for radio communication from a base station apparatus to a mobile station apparatus (downlink). In addition, an SC-FDMA (Single-Carrier Frequency Division Multiple Access) system, which is single career transmission, is used as a communication system for radio communication from the mobile station apparatus to the base station apparatus (uplink).

In an uplink of the LTE, the base station apparatus determines radio resource allocation, a coding rate, and a modulation scheme of a PUSCH, which is a channel for data transmission, by utilizing a reference signal for measuring an uplink channel (an SRS (Sounding Reference Signal)) which is transmitted by the mobile station apparatus.

In the uplink of the LTE, TPC (Transmit Power Control) is performed for the purpose of suppressing power consumption of the mobile station apparatus, and reducing given interference to other cells. Shown is a formula used to determine a transmit power value of the SRS specified in the LTE.

[Formula 1]

$$P_{SRS}(i)+\min\{P_{CMAX},P_{SRS\_OFFSET}+10\log_{10}(M_{SRS})+P_{O\_PUSCH}+\alpha\cdot PL+f(i)\} \quad (1)$$

In Formula (1), $P_{SRS}(i)$ indicates a transmit power value of the SRS in an i-th subframe. min {X, Y} is a function for selecting a minimum value of X and Y. $P_{O\_PUSCH}$ is a transmit power as the basis of the PUSCH, and is a value specified by a higher layer. $P_{SRS\_OFFSET}$ is an offset indicating a difference of transmit powers as the basis of the PUSCH and that of the SRS, and is a value specified by the higher layer. $M_{SRS}$ indicates the number of PRBs (Physical Resource Blocks), which is a unit for allocation of a radio resource used for SRS transmission, etc., and indicates that a transmit power becomes larger as the number of PRBs used for SRS transmission increases.

In addition, PL indicates a path loss, and α is a coefficient multiplied to the path loss and is specified by the higher layer. f is an offset value (TPC value by a closed loop or an open loop) calculated based on a TPC command transmitted by DCI (Downlink Control Information). In addition, $P_{CMAX}$ is a maximum transmit power value, and may be a physical maximum transmit power or may be specified by the higher layer.

In the LTE-A, it is required that the LTE-A has backward compatibility with the LTE, i.e., a base station apparatus of the LTE-A is able to simultaneously perform radio communication with both a mobile station apparatus of the LTE-A and a mobile station apparatus of the LTE, and that the mobile station apparatus of the LTE-A is able to perform radio communication with both the base station apparatus of the LTE-A and the base station apparatus of the LTE, and it has been discussed that the LTE and the LTE-A use a same channel structure.

Non-Patent Document 1 has proposed to introduce a technology in which a mobile station apparatus transmits an SRS only once in addition to periodic SRS transmission when requested to transmit the SRS by a base station apparatus in order to improve accuracy of the SRS in the LTE-A. Hereinafter, an SRS which a conventional mobile station apparatus transmits periodically is referred to as a periodic SRS, and an SRS which the conventional mobile station apparatus transmits only once when requested to transmit the SRS by the base station apparatus is referred to as an aperiodic SRS (or a one shot SRS, a scheduled SRS). Specifically, the base station apparatus performs setting of a radio resource regarding the aperiodic SRS to the mobile station apparatus in addition to setting of a period and radio resources (a frequency band and a cyclic shift) regarding the periodic SRS, includes an indicator requesting an SRS in DCI to be transmitted via a PDCCH, and transmits the DCI to the mobile station apparatus.

When the SRS is requested by the indicator, the mobile station apparatus transmits the SRS only once in accordance with the setting regarding the aperiodic SRS.

CITATION LIST

Non-Patent Document

Non-Patent Document 1: "Channel sounding enhancements for LTE-Advanced", 3GPP TSG RAN WG1 Meeting #59, R1-094653, Nov. 9-13, 2009.

DISCLOSURE OF THE INVENTION

Problem to be Solved by the Invention

However, when TPC of the periodic SRS and the aperiodic SRS is performed using Formula (1) as is conventionally done, transmit powers of the periodic SRS and the aperiodic SRS with respect to one PRB become the same as each other. In addition, since a transmit power becomes higher according to the number of PRBs used for SRS transmission, a transmit power of the aperiodic SRS reaches ten times larger as compared with a transmit power of the periodic SRS when a bandwidth used for transmission of the aperiodic SRS is ten times larger as compared with a bandwidth used for transmission of the periodic SRS.

As described above, there has been a problem that the transmit powers of the periodic SRS and the aperiodic SRS cannot be controlled individually when TPC of the SRS is performed using the conventional Formula (1).

The present invention is made in view of such a situation, and has an object to provide a radio communication system, a mobile station apparatus, a base station apparatus, a radio communication method, and an integrated circuit in which optimal TPC can be performed on each of a periodic SRS and an aperiodic SRS.

Means for Solving the Problem (1) In order to achieve the above-described object, the present invention has taken the following measures. Namely, a radio communication system of the present invention is the radio communication system which is configured with a base station apparatus and a mobile station apparatus, and in which the mobile station apparatus transmits a first reference signal or a second reference signal of a plurality of reference signals to the base station apparatus, wherein the base station apparatus sets a first parameter used for TPC of the first reference signal and a second parameter used for TPC of the second reference signal, and notifies the mobile station apparatus of the set first parameter and second parameter, and wherein the mobile station apparatus receives the first parameter and the second parameter, performs TPC of the first reference signal using the first parameter and also performs TPC of the second reference signal using the second parameter, and transmits to the base station apparatus the first reference signal and/or the second reference signal on which the TPC has been performed.

This configuration allows the base station apparatus to set the first parameter and the second parameter to each of the first reference signal and the second reference signal according to bandwidths (the number of PRBs) of the first reference signal and the second reference signal, etc., and to perform optimal TPC on each of the first reference signal or the second reference signal which is transmitted by the mobile station apparatus.

(2) In addition, in the radio communication system of the present invention, the mobile station apparatus includes a plurality of transmission antenna ports, the base station apparatus sets the first parameter and the second parameter to each of the plurality of transmission antenna ports included in the mobile station apparatus, the mobile station apparatus performs TPC of the first reference signal using the first parameter for each the transmission antenna port when transmitting the first reference signal, and the mobile station apparatus performs TPC of the second reference signal using the second parameter for each the transmission antenna port when transmitting the second reference signal.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

(3) In addition, in the radio communication system of the present invention, the first reference signal is transmitted from the mobile station apparatus at a timing set by the base station apparatus in order that the base station apparatus performs uplink channel measurement, and the second reference signal is transmitted from the mobile station apparatus only the specific number of times when the base station apparatus requests transmission of the second reference signal from the mobile station apparatus in order that the base station apparatus performs the uplink channel measurement.

This configuration allows the radio communication system of the present invention to be applied to a radio communication system of LTE-A (Long Term Evolution-Advanced).

(4) In addition, a mobile station apparatus of the present invention is the mobile station apparatus applied to a radio communication system which is configured with a base station apparatus and the mobile station apparatus, and in which the mobile station apparatus transmits a first reference signal or a second reference signal of a plurality of reference signals to the base station apparatus, wherein the mobile station apparatus includes: a mobile station side reception unit which is set by the base station apparatus, and which receives a first parameter used for TPC of the first reference signal and a second parameter used for TPC of the second reference signal; a mobile station side higher layer processing unit which performs TPC of the first reference signal using the first parameter while performing TPC of the second reference signal using the second parameter; and a mobile station side transmission unit which transmits to the base station apparatus the first reference signal and/or the second reference signal on which the TPC has been performed.

This configuration allows the base station apparatus to set the first parameter and the second parameter to each of the first reference signal and the second reference signal according to bandwidths (the number of PRBs) of the first reference signal and the second reference signal, etc., and to perform optimal TPC on each of the first reference signal or the second reference signal which is transmitted by the mobile station apparatus.

(5) In addition, the mobile station apparatus of the present invention includes a plurality of transmission antenna ports, the mobile station side reception unit receives a first parameter and a second parameter to each of the plurality of transmission antenna ports transmitted by the base station apparatus, and the mobile station side higher layer processing unit performs TPC of the first reference signal using the first parameter for each the transmission antenna port when transmitting the first reference signal, and performs TPC of the second reference signal using the second parameter for each the transmission antenna port when transmitting the second reference signal.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

(6) In addition, in the mobile station apparatus of the present invention, the first reference signal is transmitted at a timing set by the base station apparatus in order that the base station apparatus performs uplink channel measurement, and the second reference signal is transmitted only the specific number of times when transmission of the second reference signal is requested from the base station apparatus in order that the base station apparatus performs the uplink channel measurement.

This configuration allows the mobile station apparatus of the present invention to be applied to the radio communication system of LTE-A (Long Term Evolution-Advanced).

(7) In addition, a base station apparatus of the present invention is the base station apparatus applied to a radio communication system which is configured with the base station apparatus and a mobile station apparatus, and in which the mobile station apparatus transmits a first reference signal or a second reference signal of a plurality of reference signals to the base station apparatus, wherein the base station apparatus includes: a base station side higher layer processing unit which sets a first parameter used for TPC of the first reference signal and a second parameter used for TPC of the second reference signal; and a base station side transmission unit which notifies the mobile station apparatus of the set first parameter and second parameter.

This configuration allows the base station apparatus to set the first parameter and the second parameter to each of the first reference signal and the second reference signal according to bandwidths (the number of PRBs) of the first reference signal and the second reference signal, etc., and to perform optimal TPC to each of the first reference signal or the second reference signal which is transmitted by the mobile station apparatus.

(8) In addition, in the base station apparatus of the present invention, the base station side higher layer processing unit sets the first parameter and the second parameter to each of a plurality of transmission antenna ports included in the mobile station apparatus.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

(9) In addition, in the base station apparatus of the present invention, the first reference signal is transmitted from the mobile station apparatus at a set timing in order that the own apparatus performs uplink channel measurement, and the second reference signal is transmitted from the mobile station apparatus only the specific number of times when the own apparatus requests transmission of the second reference signal from the mobile station apparatus in order to perform the uplink channel measurement.

This configuration allows the base station apparatus of the present invention to be applied to the radio communication system of LTE-A (Long Term Evolution-Advanced).

(10) In addition, a radio communication method of the present invention is the radio communication method of a radio communication system which is configured with a base station apparatus and a mobile station apparatus, and in which the mobile station apparatus transmits a first reference signal or a second reference signal of a plurality of reference signals to the base station apparatus, and the radio communication method includes at least the steps of: in the base station apparatus, setting a first parameter used for TPC of the first reference signal and a second parameter used for TPC of the second reference signal; and notifying the mobile station apparatus of the set first parameter and second parameter; and in the mobile station apparatus, receiving the first parameter and the second parameter; performing TPC of the first reference signal using the first parameter while performing TPC of the second reference signal using the second parameter; and transmitting to the base station apparatus the first reference signal and/or the second reference signal on which the TPC has been performed.

This configuration allows the base station apparatus to set the first parameter and the second parameter to each of the first reference signal and the second reference signal according to bandwidths (the number of PRBs) of the first reference signal and the second reference signal, etc., and to perform optimal TPC on each of the first reference signal or the second reference signal which is transmitted by the mobile station apparatus.

(11) In addition, the radio communication method of the present invention further includes the steps of: in the base station apparatus, setting the first parameter and the second parameter to each of a plurality of transmission antenna ports included in the mobile station apparatus; and in the mobile station apparatus, performing TPC of the first reference signal using the first parameter for each the transmission antenna port when transmitting the first reference signal, and performing TPC of the second reference signal using the second parameter for each the transmission antenna port when transmitting the second reference signal.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

(12) In addition, in the radio communication method of the present invention, the first reference signal is transmitted from the mobile station apparatus at a timing set by the base station apparatus in order that the base station apparatus performs uplink channel measurement, and the second reference signal is transmitted from the mobile station apparatus only the specific number of times when the base station apparatus requests transmission of the second reference signal from the mobile station apparatus in order that the base station apparatus performs the uplink channel measurement.

This configuration allows the radio communication method of the present invention to be applied to the radio communication system of LTE-A (Long Term Evolution-Advanced).

(13) In addition, an integrated circuit of the present invention is the integrated circuit which causes a mobile station apparatus to exhibit a plurality of functions by being mounted in the mobile station apparatus, and the integrated circuit causes the mobile station apparatus to exhibit a series of functions including functions of: transmitting a first reference signal which is transmitted at a timing set by a base station apparatus in order that the base station apparatus performs uplink channel measurement, or a second reference signal which is transmitted only the specific number of times when transmission of the second reference signal is requested from the base station apparatus in order that the base station apparatus performs the uplink channel measurement; receiving a first parameter used for TPC of the first reference signal and a second parameter used for TPC of the second reference signal, the first parameter and the second parameter being set by the base station apparatus; performing TPC of the first reference signal using the first parameter while performing TPC of the second reference signal using the second parameter; and transmitting to the base station apparatus the first reference signal and/or the second reference signal on which the TPC has been performed.

This configuration allows the base station apparatus to set the first parameter and the second parameter to each of the first reference signal and the second reference signal according to bandwidths (the number of PRBs) of the first reference signal and the second reference signal, etc., and to perform optimal TPC on each of the first reference signal or the second reference signal which is transmitted by the mobile station apparatus. In addition, this configuration allows the integrated circuit of the present invention to be applied to the radio communication system of LTE-A (Long Term Evolution-Advanced).

(14) In addition, the integrated circuit of the present invention is mounted in the mobile station apparatus including a plurality of transmission antenna ports, and further includes functions of: receiving a first parameter and a second parameter to each of the plurality of transmission antenna ports transmitted by the base station apparatus; and performing TPC of the first reference signal using the first parameter for each the transmission antenna port when the first reference signal is transmitted and performing TPC of the second reference signal using the second parameter for each the transmission antenna port when the second reference signal is transmitted.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

(15) In addition, an integrated circuit of the present invention is the integrated circuit which causes a base station apparatus to exhibit a plurality of functions by being mounted in the base station apparatus, and the integrated circuit causes the base station apparatus to exhibit a series of functions including functions of: setting a first parameter used for TPC of a first reference signal which is transmitted from the mobile station apparatus at a set timing in order that the own apparatus performs uplink channel measurement, or a second parameter used for TPC of a second reference signal which is transmitted from the mobile station apparatus only the specific number of times when the own apparatus requests transmission of the second reference signal from the mobile station apparatus in order to perform the uplink channel measurement; and notifying the mobile station apparatus of the set first parameter and second parameter.

This configuration allows the base station apparatus to set a first parameter and a second parameter to each of a first reference signal and a second reference signal according to bandwidths (the number of PRBs) of the first reference signal and the second reference signal, etc., and to perform optimal TPC on each of the first reference signal or the second reference signal which is transmitted by the mobile station apparatus. In addition, this configuration allows the integrated circuit of the present invention to be applied to the radio communication system of LTE-A (Long Term Evolution-Advanced).

(16) In addition, the integrated circuit of the present invention further includes a function of setting the first parameter and the second parameter to each of a plurality of transmission antenna ports included in the mobile station apparatus.

This configuration makes it possible to increase a transmit power of a transmission antenna port with a high priority of the mobile station apparatus, for example, a transmission antenna port through which a signal is transmitted, and also makes it possible to decrease a transmit power of a transmission antenna port with a low priority, for example, an antenna port through which the signal is not transmitted. Thereby, it becomes possible to perform flexible TPC according to a priority of the transmission antenna port.

Advantage of the Invention

According to the present invention, a base station apparatus can perform optimal TPC on each of a first reference signal (periodic SRS) and a second reference signal (aperiodic SRS) which are transmitted by a mobile station apparatus.

BEST MODES FOR CARRYING OUT THE INVENTION

First Embodiment

Hereinafter, a first embodiment of the present invention will be described in detail with reference to drawings.

<Regarding Radio Communication System>

Figure 1:
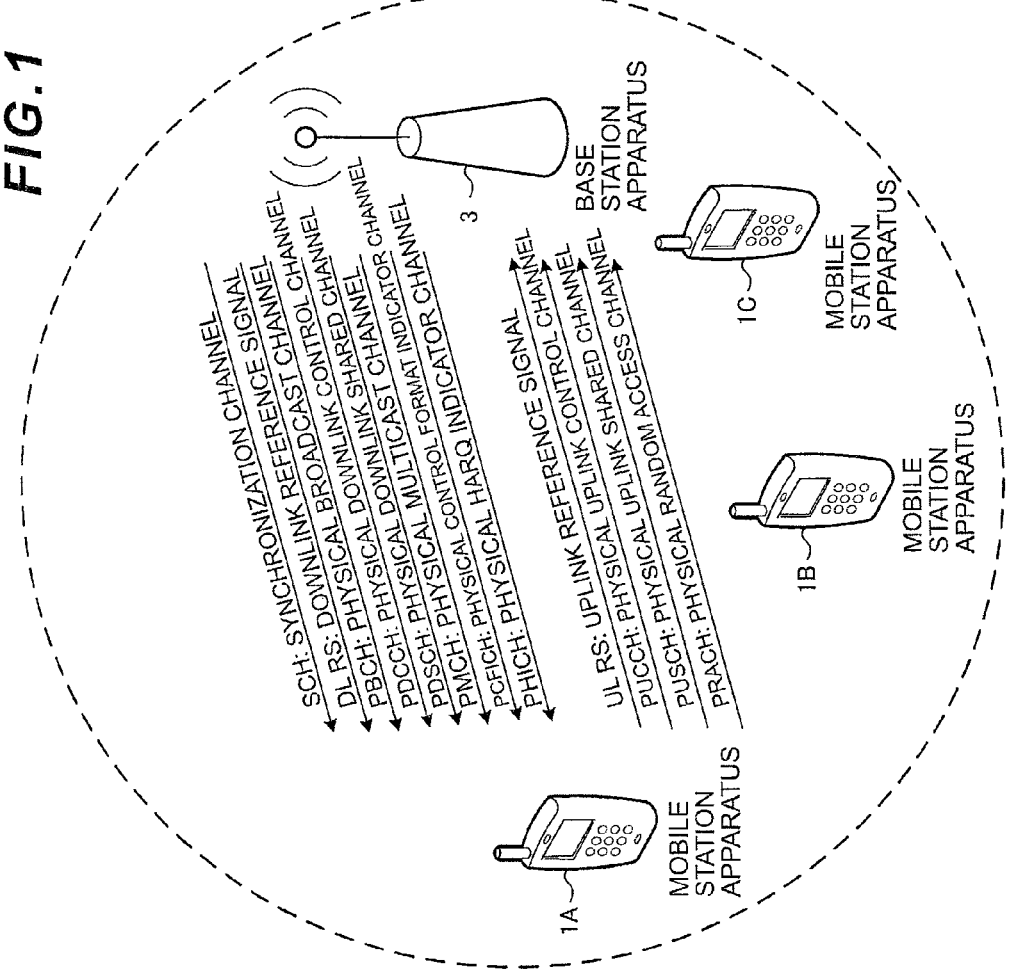
FIG. 1 is a conceptual illustration of a radio communication system of the present embodiment.

FIG. 1 is a conceptual illustration of a radio communication system of the present embodiment. In FIG. 1, the radio communication system includes mobile station apparatuses 1A to 1C and a base station apparatus 3. FIG. 1 shows that in radio communication from the base station apparatus 3 to the mobile station apparatuses 1A to 1C (downlink), allocated are an SCH (Synchronization Channel), a downlink pilot channel (or, also referred to as a "DL RS (Downlink Reference Signal)"), a PBCH (Physical Broadcast Channel), a PDCCH (Physical Downlink Control Channel), a PDSCH (Physical Downlink Shared Channel), a PMCH (Physical Multicast Channel), a PCFICH (Physical Control Format Indicator Channel), and a PHICH (Physical Hybrid ARQ Indicator Channel).

In addition, FIG. 1 shows that in radio communication from the mobile station apparatuses 1A to 1C to the base station apparatus 3 (uplink), allocated are an uplink pilot channel (or, also referred to as a "UL RS (Uplink Reference Signal)"), a PUCCH (Physical Uplink Control Channel), a PUSCH (Physical Uplink Shared Channel), and a PRACH (Physical Random Access Channel). The UL RS includes a reference signal for demodulation of the PUSCH and the PUCCH (DMRS (Demodulation Reference Signal)) and a reference signal for uplink channel estimation (SRS (Sounding Reference Signal)). Hereinafter, the mobile station apparatuses 1A to 1C are referred to as a mobile station apparatus 1.

<Regarding Uplink Radio Frame>

Figure 2:
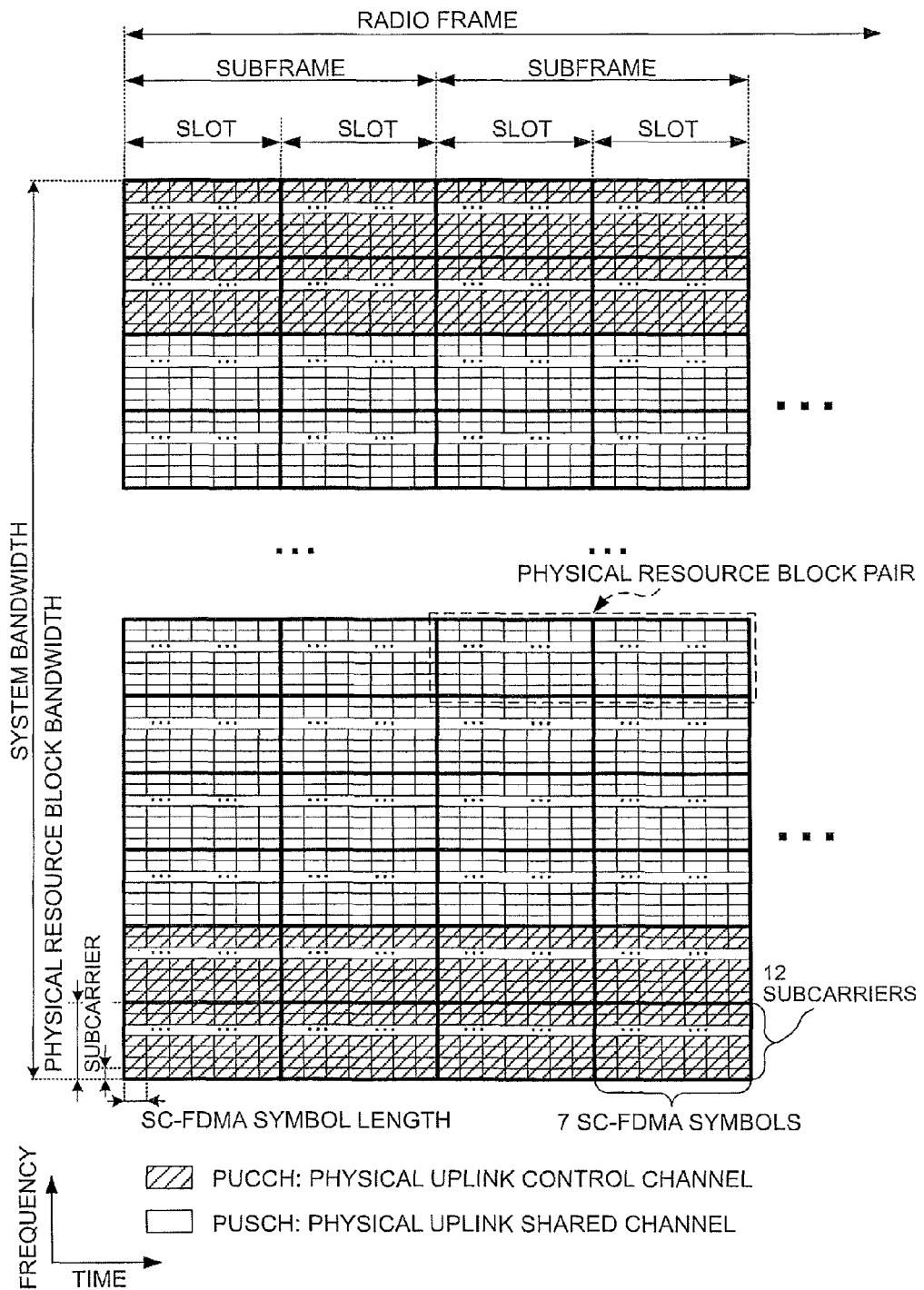
FIG. 2 is a schematic chart showing one example of a configuration of an uplink radio frame of the present embodiment.

FIG. 2 is a schematic chart showing one example of a configuration of an uplink radio frame of the present embodiment. FIG. 2 shows a configuration of a certain radio frame in an uplink. In FIG. 2, a horizontal axis indicates a time domain and a vertical axis indicates a frequency domain. As shown in FIG. 2, the uplink radio frame is configured with a plurality of uplink PRB pairs (for example, a region surrounded with a dashed line in FIG. 2). This uplink PRB pair is a unit of radio resource allocation, etc., and is configured with a frequency band with a predetermined width (PRB bandwidth; 180 kHz) and a time zone (two slots are equal to one subframe; 1 ms).

One uplink PRB pair is configured with two uplink PRBs (PRB bandwidth×slot) contiguous in the time domain. One uplink PRB (a unit surrounded with a thick line in FIG. 2) is configured with twelve subcarriers (15 kHz) in the frequency domain and configured with seven SC-FDMA symbols (71 μs) in the time domain.

In the time domain, included are a slot (0.5 ms) configured with seven SC-FDMA (Single-Carrier Frequency Division Multiple Access) symbols (71 μs), a subframe (1 ms) configured with two slots, and a radio frame (10 ms) configured with ten subframes. In the frequency domain, a plurality of uplink PRBs is arranged according to an uplink bandwidth. It is to be noted that a unit configured with one subcarrier and one SC-FDMA symbol is referred to as an uplink resource element.

Hereinafter, a channel which is allocated in the uplink radio frame will be described. In each uplink subframe, for example, a PUCCH, a PUSCH, a DMRS, and an SRS are allocated.

First, the PUCCH will be described. The PUCCH is allocated to uplink PRB pairs (regions hatched with rising oblique lines from bottom left to top right) of both ends of an uplink bandwidth. In the PUCCH, arranged is a signal of UCI (Uplink Control Information), which is the information used for controlling communication, such as CQI (Channel Quality Information) indicating a downlink channel quality, an SR (Scheduling Request) indicating a request for uplink radio resource allocation, and ACK/NACK which are reception responses to the PDSCH.

Next, the PUSCH will be described. The PUSCH is allocated to uplink PRB pairs (region without hatching) other than the uplink PRBs in which the PUCCH is assigned. In the PUSCH, assigned are signals of the UCI and data information (Transport Block), which is the information other than the UCI. A radio resource of the PUSCH is allocated using an uplink grant, and is assigned in an uplink subframe after a predetermined time from the subframe having received the PDCCH including the uplink grant.

Figure 3:
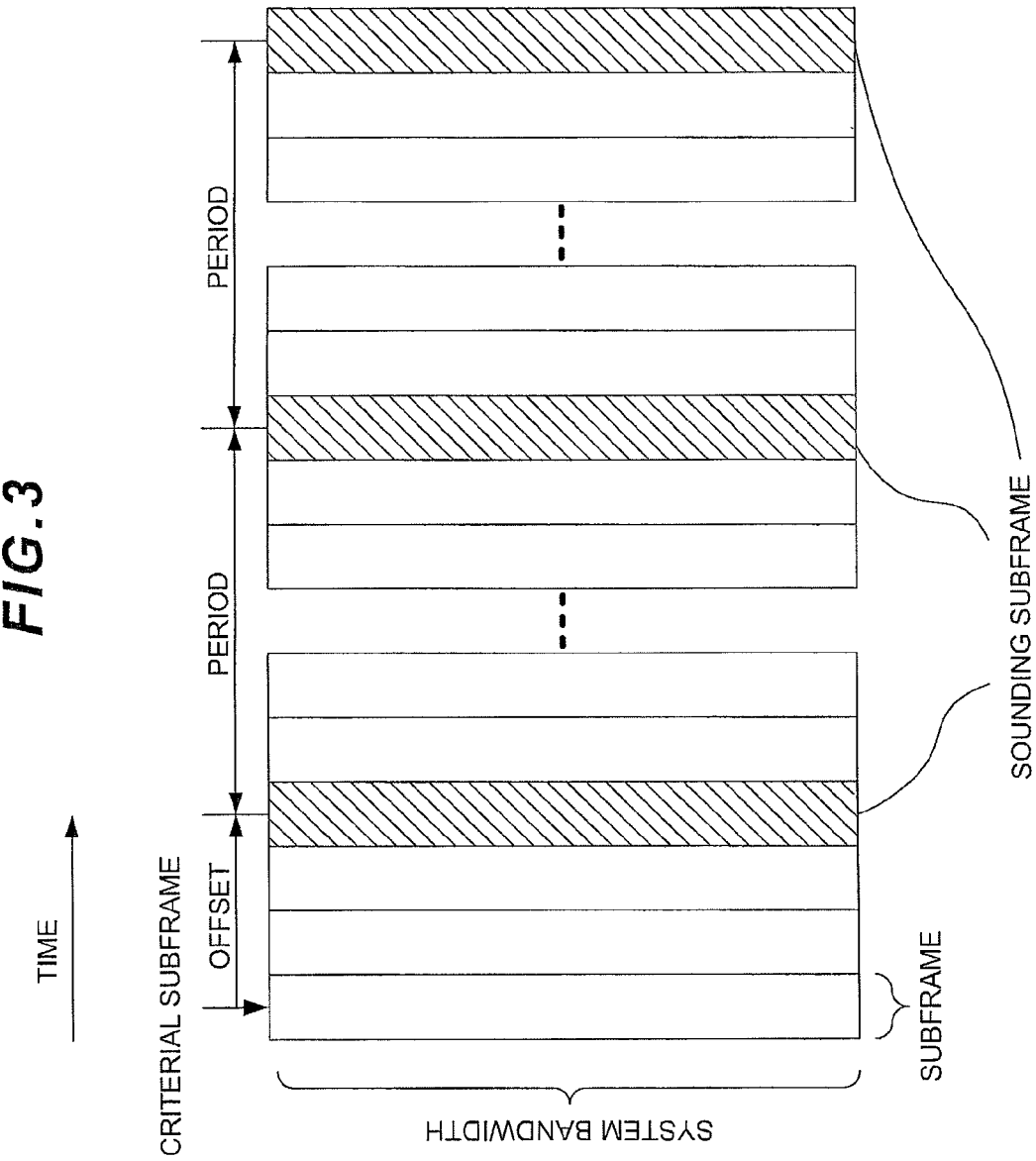
FIG. 3 is a chart illustrating a radio resource for transmitting an SRS of the present embodiment.

Next, the SRS and the DMRS will be described. FIG. 3 is a chart illustrating a radio resource for transmitting an SRS of the present embodiment. In FIG. 3, a horizontal axis indicates a time domain. The base station apparatus 3 sets a sounding subframe, which is the subframe for the mobile station apparatus 1 to reserve a radio resource for transmitting an SRS. Specifically, the sounding subframe is given an offset from a criterial subframe and a period. In addition, the sounding subframe is common to all the mobile station apparatuses 1.

In addition, the base station apparatus 3 sets a sounding subframe and a radio resource for the mobile station apparatus 1 to actually transmit the SRS, and the mobile station apparatus 1 periodically transmits the SRS in accordance with the setting.

Figure 4:
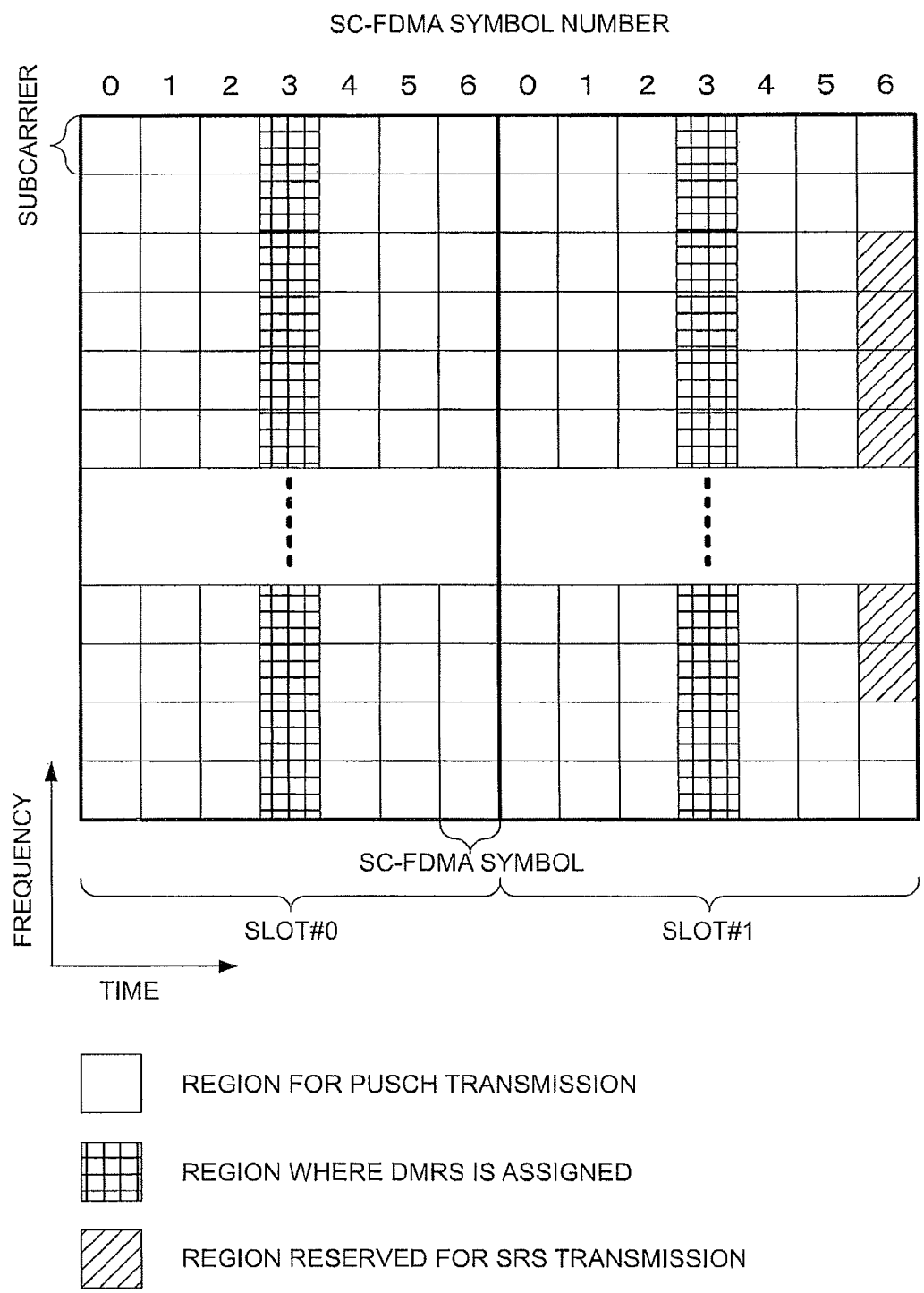
FIG. 4 is a chart showing a detailed configuration of a sounding subframe of the present embodiment.

FIG. 4 is a chart showing a detailed configuration of a sounding subframe of the present embodiment. However, in FIG. 4, only bands which can be utilized as a PUSCH are depicted, and frequency bands for transmitting a PUCCH and a PRACH are omitted. In FIG. 4, a horizontal axis indicates a time domain and a vertical axis indicates a frequency domain. In the frequency domain, one block represents a subcarrier. As shown in FIG. 4, each of the SC-FDMA symbols can be utilized for different applications, and a No. 3 SC-FDMA symbol in each slot is utilized for transmission of the DMRS. A sixth SC-FDMA symbol in a No. 1 slot is utilized for transmission of the SRS. The base station apparatus 3 sets a bandwidth of the radio resource reserved for SRS transmission in addition to a bandwidth which can be utilized as the PUSCH, and a radio resource which has not been reserved for SRS transmission in the sixth SC-FDMA symbol in the No. 1 slot can be utilized as the PUSCH.

SC-FDMA symbols other than the sixth SC-FDMA symbol in the No. 1 slot are utilized for PUSCH transmission. Here, in the DMRS and the SRS, an orthogonal code is utilized for multiplexing with other mobile station apparatuses 1, and for identifying an antenna, and utilized is a sequence obtained by cyclic shifting a CAZAC (Constant Amplitude and zero-autocorrelation) sequence on a time axis. Although the DMRS is multiplexed with an SC-FDMA symbol different from the PUSCH when time-multiplexed with the PUCCH, a detailed description thereof is omitted for simplifying a description.

Figure 5:
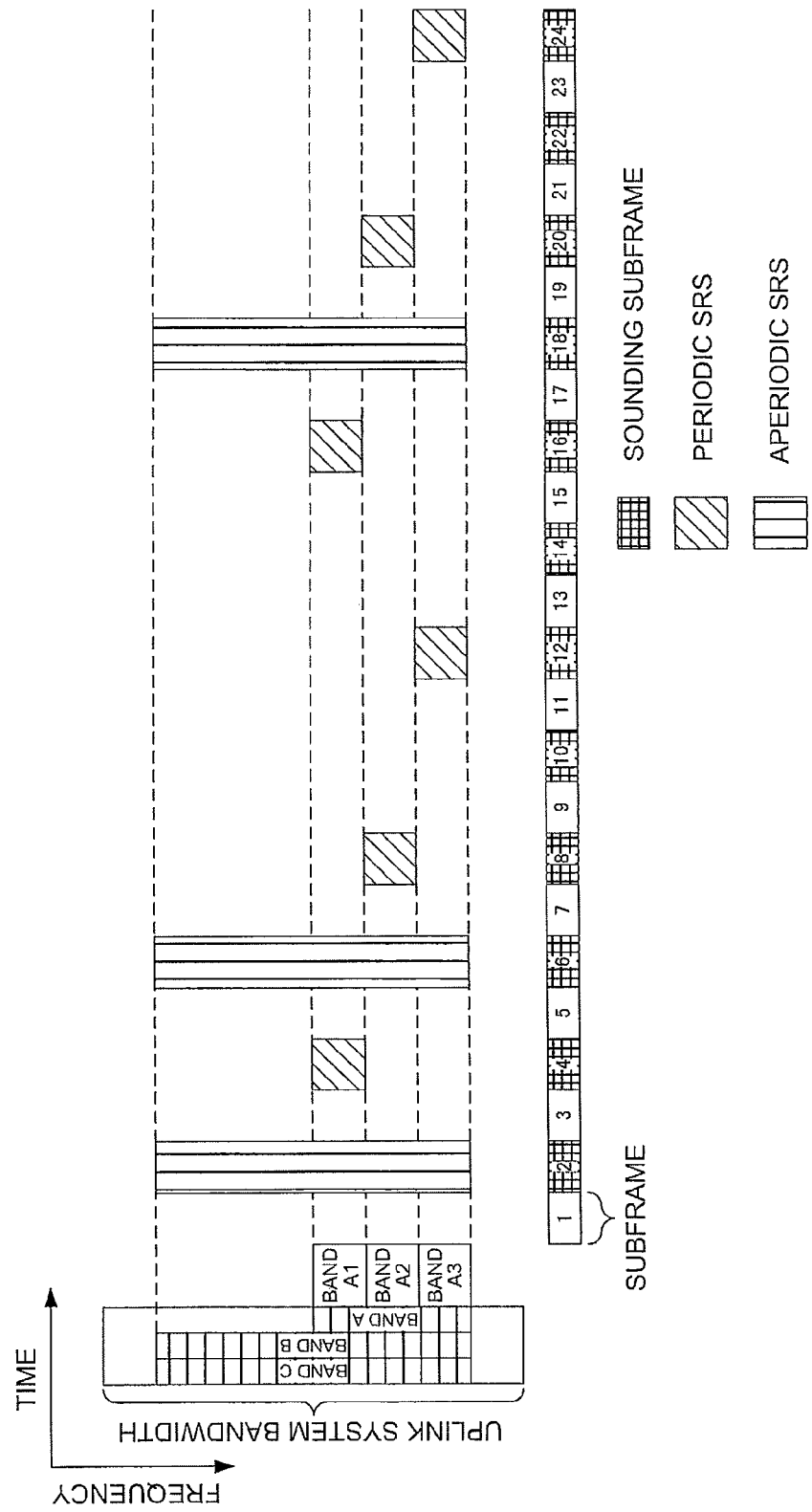
FIG. 5 is a chart illustrating a transmission method of an SRS of the present embodiment.

FIG. 5 is a chart illustrating a transmission method of an SRS of the present embodiment. In FIG. 5, a horizontal axis indicates a time domain and a vertical axis indicates a frequency domain. The base station apparatus 3 performs setting regarding transmission of an SRS common to the mobile station apparatuses 1. In this setting, the base station apparatus 3 sets a position of the sounding subframe, which is the subframe for which the radio resource for SRS transmission has been reserved, and a bandwidth of the radio resource reserved for SRS transmission.

In addition, the base station apparatus 3 sets to each of the mobile station apparatuses 1 a subframe which transmits an SRS periodically, a frequency band, and an amount of cyclic shift used for the CAZAC sequence of a periodic SRS. Hereinafter, the SRS transmitted periodically is referred to as a periodic SRS. A subframe which transmits the periodic SRS is apart of the sounding subframe, and a frequency band for transmitting the periodic SRS is a part of a frequency band reserved for SRS transmission.

In addition, the base station apparatus 3 sets to each of the mobile station apparatuses 1 setting of an aperiodic SRS (or one shot SRS, or a scheduled SRS) which the mobile station apparatus 1 transmits only when the base station apparatus requests by an indicator which requests the SRS, the indicator included in DCI (Downlink Control Information) transmitted via the PDCCH. In this setting, the base station apparatus 3 sets a frequency band for transmitting the aperiodic SRS and an amount of cyclic shift used for a CAZAC sequence of the aperiodic SRS.

It is to be noted that in the description, a periodic SRS is defined to configure a first reference signal, and an aperiodic SRS is defined to configure a second reference signal.

In FIG. 5, subframes of even numbers are sounding subframes, and a band C is a bandwidth of the radio resource reserved for SRS transmission. In addition, the mobile station apparatus 1 is configured to transmit a periodic SRS in {fourth, eighth, twelfth, sixteenth, twentieth, and twenty-fourth} subframes of the sounding subframes, a band for the mobile station apparatus 1 to transmit the periodic SRS is a band A which is a part of the band C, and the mobile station apparatus 1 transmits the periodic SRS by one transmission of the periodic SRS in any one of a band A1, a band A2, and a band A3, each corresponding to one-third of the bandwidth of the band A. An order of transmitting the periodic SRS in the band A1, the band A2, and the band A3 is predetermined.

In addition, in FIG. 5, a band B, which is a part of the band C, is a frequency band set for aperiodic SRS transmission, and it is requested by the base station apparatus 3 that the mobile station apparatus 1 transmits the aperiodic SRS in {second, sixth and eighteenth} subframes of the sounding subframes. It is to be noted that the band A may be the same frequency band as the band B and/or the band C, a number to divide the band A may be a number other than three, the band A need not be divided, the band B may not have the same frequency band as the band C, and that the band B need not include the band A. It is to be noted that the periodic SRS may be set so as to transmit an SRS only once.

<Regarding TPC (Transmit Power Control)>

In an uplink of the present embodiment, TPC of a periodic SRS and aperiodic SRS is performed for the purpose of suppressing power consumption of the mobile station apparatus 1, or reducing given interference to other cells. Shown is a formula used to determine transmit power values of the periodic SRS and the aperiodic SRS of the present embodiment.

[Formula 2]

$$P_{SRS}(i)+\min\{P_{CMAX},P_{SRS\_OFFSET}(k)+10\log_{10}(M_{SRS})+P_{O\_PUSCH}+\alpha\cdot PL+f(i)\} \quad (2)$$

In Formula (2), $P_{SRS}$ (i) indicates a transmit power value of an SRS in an i-th subframe. min {X, Y} is a function for selecting a minimum value of X and Y. $P_{O\_PUSCH}$ is a transmit power as the basis of the PUSCH, and is a value specified by a higher layer. $M_{SRS}$ indicates the number of PRBs (Physical Resource Blocks), which are units for allocation of a radio resource used for SRS transmission, etc., and indicates that a transmit power becomes larger as the number of PRBs used for SRS transmission increases. In addition, PL indicates a path loss, and α is a coefficient multiplied to the path loss and is specified by the higher layer. f is an offset value (a TPC value by a closed loop or an open loop) calculated based on a TPC command transmitted by DCI assigned in the PDCCH, and is a parameter common to the PUSCH and the SRS. In addition, $P_{CMAX}$ is a maximum transmit power value, and may be physical maximum transmit power or may be specified by the higher layer.

$P_{SRS\_OFFSET}$ (k) is an offset indicating a difference of transmit powers as the basis of the PUSCH and that of the SRS, and is a value specified by the higher layer. k indicates the periodic SRS or the aperiodic SRS, and, for example, it is defined to be k=0 in a case of the periodic SRS, and k=1 in a case of the aperiodic SRS. Each of $P_{SRS\_OFFSET}$ (0) Of the periodic SRS and $P_{SRS\_OFFSET}$ (1) of the aperiodic SRS is specified by the higher layer. As described above, by setting the $P_{SRS\_OFFSET}$ separately in the periodic SRS and the aperiodic SRS, TPC can be flexibly performed in consideration of applications of the periodic SRS and the aperiodic SRS, and a bandwidth (the number of PRBs) $M_{SRS}$, and a maximum transmit power value $P_{CMAX}$.

For example, assume that $P_{SRS\_OFFSET}$ is common in the periodic SRS and the aperiodic SRS, $P_{CMAX}$=23 [dBm], the periodic SRS $P_{SRS}$=20 [dBm], the periodic SRS $M_{SRS}$=4, and the aperiodic SRS $M_{SRS}$=16, a power which the mobile station apparatus 1 calculates as a transmit power of the aperiodic SRS becomes 26 [dBm], which exceeds the $P_{CMAX}$, and the mobile station apparatus 1 transmits the aperiodic SRS at $P_{CMAX}$=23 [dBm]. However, although the base station apparatus 3 cannot perform proper channel measurement since it does not know a parameter of the PL, and thus does not understand that the calculated transmit power of the aperiodic SRS exceeds the $P_{CMAX}$, and that the aperiodic SRS is transmitted by the power of the $P_{CMAX}$ by using the present embodiment, the base station apparatus 3 can set $P_{SRS\_OFFSET}$ separately according to the $M_{SRS}$ of the periodic SRS and the aperiodic SRS so that values calculated as transmit powers of the periodic SRS and the aperiodic SRS do not exceed the $P_{CMAX}$.

<Regarding Configuration of Base Station Apparatus 3>

Figure 6:
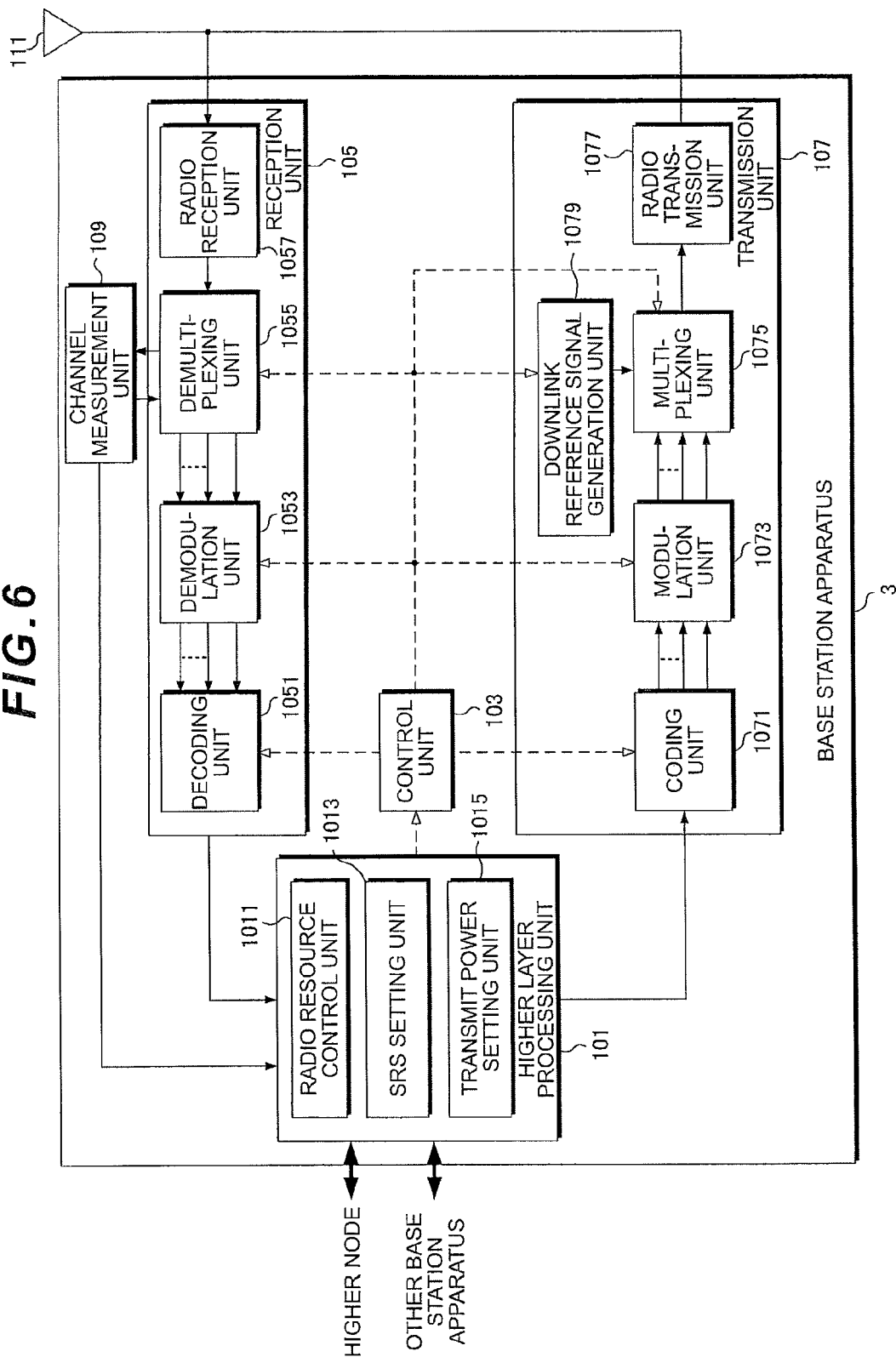
FIG. 6 is a schematic block diagram showing a configuration of a base station apparatus 3 of the present embodiment.

FIG. 6 is a schematic block diagram showing a configuration of the base station apparatus 3 of the present embodiment. As shown in the drawing, the base station apparatus 3 includes a higher layer processing unit 101, a control unit 103, a reception unit 105, a transmission unit 107, a channel measurement unit 109, and a transmission/reception antenna 111. In addition, the higher layer processing unit 101 includes a radio resource control unit 1011, an SRS setting unit 1013, and a transmit power setting unit 1015. In addition, the reception unit 105 includes a decoding unit 1051, a demodulation unit 1053, a demultiplexing unit 1055, and a radio reception unit 1057. In addition, the transmission unit 107 includes a coding unit 1071, a modulation unit 1073, a multiplexing unit 1075, a radio transmission unit 1077, and a DL RS generation unit 1079.

The higher layer processing unit 101 performs processing of a PDCP (Packet Data Convergence Protocol) layer, an RLC (Radio Link Control) layer, and an RRC (Radio Resource Control) layer.

The radio resource control unit 1011 provided in the higher layer processing unit 101 generates information which is assigned in each channel of the downlink, or obtains the information from an higher node, and outputs it to the transmission unit 107. In addition, the radio resource control unit 1011 allocates a radio resource in which the mobile station apparatus 1 assigns the PUSCH (data information) from among uplink radio resources. In addition, the radio resource control unit 1011 determines a radio resource in which the PDSCH (data information) is assigned from among downlink radio resources. The radio resource control unit 1011 generates DCI indicating allocation of the radio resource, and transmits the DCI to the mobile station apparatus 1 through the transmission unit 107. The radio resource control unit 1011 preferentially allocates a radio resource with a good channel quality on the basis of an uplink channel measurement result having input from the channel measurement unit 109 in allocating the radio resource in which the PUSCH is assigned.

The radio resource control unit 1011 generates control information in order to control the reception unit 105 and the transmission unit 107 based on UCI (ACK/NACK, channel quality information and an SR) notified from the mobile station apparatus 1 via the PUCCH, and a buffer condition notified from the mobile station apparatus 1, and various setting information of each of the mobile station apparatuses 1 set by the radio resource control unit 1011, and outputs the control information to the control unit 103.

The SRS setting unit 1013 sets a sounding subframe, which is the subframe for the mobile station apparatuses 1 to reserve a radio resource for transmitting an SRS, and a bandwidth of the radio resource reserved to transmit the SRS within the sounding subframe, generates the setting as system information, and broadcast-transmits it via the PDSCH through the transmission unit 107. In addition, the SRS setting unit 1013 sets to each of the mobile station apparatuses 1 a subframe for periodically transmitting a periodic SRS, a frequency band, and an amount of cyclic shift used for a CAZAC sequence of the periodic SRS, generates the setting as a radio resource control signal, and notifies each of the mobile station apparatuses 1 of the radio resource control signal via the PDSCH through the transmission unit 107.

In addition, the SRS setting unit 1013 sets to each of the mobile station apparatuses 1 a frequency band for transmitting an aperiodic SRS, and an amount of cyclic shift used for a CAZAC sequence of the aperiodic SRS, generates the setting as a radio resource control signal, and notifies each of the mobile station apparatuses 1 of the radio resource control signal via the PDSCH through the transmission unit 107. In addition, the SRS setting unit 1013, when requesting an aperiodic SRS from the mobile station apparatus 1, generates an SRS indicator which indicates requesting the aperiodic SRS from the mobile station apparatus 1, and notifies the mobile station apparatus 1 of the SRS indicator via the PDCCH through the transmission unit 107.

The transmit power setting unit 1015 sets transmit powers of the PUCCH, the PUSCH, the periodic SRS, and the aperiodic SRS. Specifically, the transmit power setting unit 1015 sets a transmit power so that the PUSCH etc. satisfy a predetermined channel quality, also in consideration of interference to the adjacent base station apparatus 3 and power consumption of the mobile station apparatus 1 according to information indicating an interference amount from an adjacent base station apparatus 3, information indicating the interference amount given to the adjacent base station apparatus 3 which has been notified from the adjacent base station apparatus 3, and a channel quality having input from the channel measurement unit 109, etc., and transmits information indicating the setting to the mobile station apparatus 1 through the transmission unit 107.

Specifically, the transmit power setting unit 1015 sets $P_{O\_PUSCH}$, $\alpha$, $P_{SRS\_OFFSET}(0)$ for the periodic SRS (a first parameter), $P_{SRS\_OFFSET}(1)$ for the aperiodic SRS (a second parameter) in Formula (2), generates the setting as a radio resource control signal, and notifies each of the mobile station apparatuses 1 of the radio resource control signal via the PDSCH through the transmission unit 107. In addition, the transmit power setting unit 1015 sets a TPC command for calculating f in Formula (2), generates a TPC command, and notifies each of the mobile station apparatuses 1 of the TPC command via the PDSCH through the transmission unit 107.

The control unit 103 generates a control signal which performs control of the reception unit 105 and the transmission unit 107 based on the control information from the higher layer processing unit 101. The control unit 103 outputs the generated control signal to the reception unit 105 and the transmission unit 107, and performs control of the reception unit 105 and the transmission unit 107.

The reception unit 105 separates, demodulates, and decodes the received signal received from the mobile station apparatus 1 through the transmission/reception antenna 111 in accordance with the control signal input from the control unit 103, and outputs the decoded information to the higher layer processing unit 101. The radio reception unit 1057 converts (down-converts) into an intermediate frequency an uplink signal received through the transmission/reception antenna 111, removes an unnecessary frequency component, controls an amplification level so that a signal level is maintained appropriately, orthogonally demodulates the signal based on an in-phase component and an orthogonal component of the received signal, and converts the orthogonally demodulated analog signal into a digital signal. The radio reception unit 1057 removes a portion corresponding to a GI (Guard Interval) from the converted digital signal. The radio reception unit 1057 performs FFT (Fast Fourier Transform) on the signal from which the GI has been removed to extract a signal in the frequency domain, and outputs the signal to the demultiplexing unit 1055.

The demultiplexing unit 1055 separates the signals input from the radio reception unit 1057 into signals, such as a PUCCH, a PUSCH, a DMRS, and an SRS, respectively. It is to be noted that this separation is performed based on the allocation information of the radio resource which has been previously determined and notified to each mobile station apparatus 1 by the base station apparatus 3. In addition, the demultiplexing unit 1055 compensates a channel of the PUCCH and the PUSCH based on an estimate value input from the channel measurement unit 109. In addition, the demultiplexing unit 1055 outputs the separated DMRS and SRS to the channel measurement unit 109.

The demodulation unit 1053 performs IDFT (Inverse Discrete Fourier Transform) on the PUSCH, obtains a modulation symbol, and demodulates the received signal with respect to the respective modulation symbols of the PUCCH and the PUSCH using a predetermined modulation scheme, such as BPSK (Binary Phase Shift Keying), QPSK (Quadrature Phase Shift Keying), 16QAM (16Quadrature Amplitude Modulation), and 64QAM (64Quadrature Amplitude Modulation), or a modulation scheme which has been previously notified from the base station apparatus 3 to each of the mobile station apparatuses 1 by downlink control information.

The decoding unit 1051 decodes the demodulated encoded bits of the PUCCH and the PUSCH using a predetermined coding rate of a predetermined coding scheme or using a coding rate preliminarily notified from the base station apparatus 3 to the mobile station apparatus 1 by the uplink grant, and outputs the decoded data information and the UCI to the higher layer processing unit 101.

The channel measurement unit 109 measures an estimate value of a channel, a channel quality, etc. based on the DMRS and the SRS input from the demultiplexing unit 1055, and outputs them to the demultiplexing unit 1055 and the higher layer processing unit 101.

The transmission unit 107 generates a DL RS in accordance with the control signal input from the control unit 103, encodes and modulates the data information and the DCI which have been input from the higher layer processing unit 101, multiplexes the PDCCH, the PDSCH, and the DL RS, and transmits the signal to the mobile station apparatus 1 through the transmission/reception antenna.

The coding unit 1071 performs coding, such as turbo coding, convolution coding, block coding, on the DCI and the data information which have been input from the higher layer processing unit 101. The coding unit 1071 modulates the coded bit using a modulation scheme, such as QPSK, 16QAM, and 64QAM. The DL RS generation unit 1079 generates as a DL RS a known sequence of the mobile station apparatus 1 which can be calculated by a rule predetermined based on a cell ID for identifying the base station apparatus 3. The multiplexing unit 1075 multiplexes each modulated channel and the generated DL RS.

The radio transmission unit 1077 performs IFFT (Inverse Fast Fourier Transform) on the multiplexed modulation symbol to perform modulation of an OFDM system, adds a GI to the OFDM-modulated OFDM symbol, generates a digital signal of a baseband, converts the digital signal of the baseband into an analog signal, generates an in-phase component and an orthogonal component of an intermediate frequency from the analog signal, removes an excessive frequency component with respect to an intermediate frequency band, converts (up-converts) a signal of the intermediate frequency into a high-frequency signal, removes an excessive frequency component, amplifies power, and outputs the resultant signal to the transmission/reception antenna 111 for transmission.

<Regarding Configuration of Mobile Station Apparatus 1>

Figure 7:
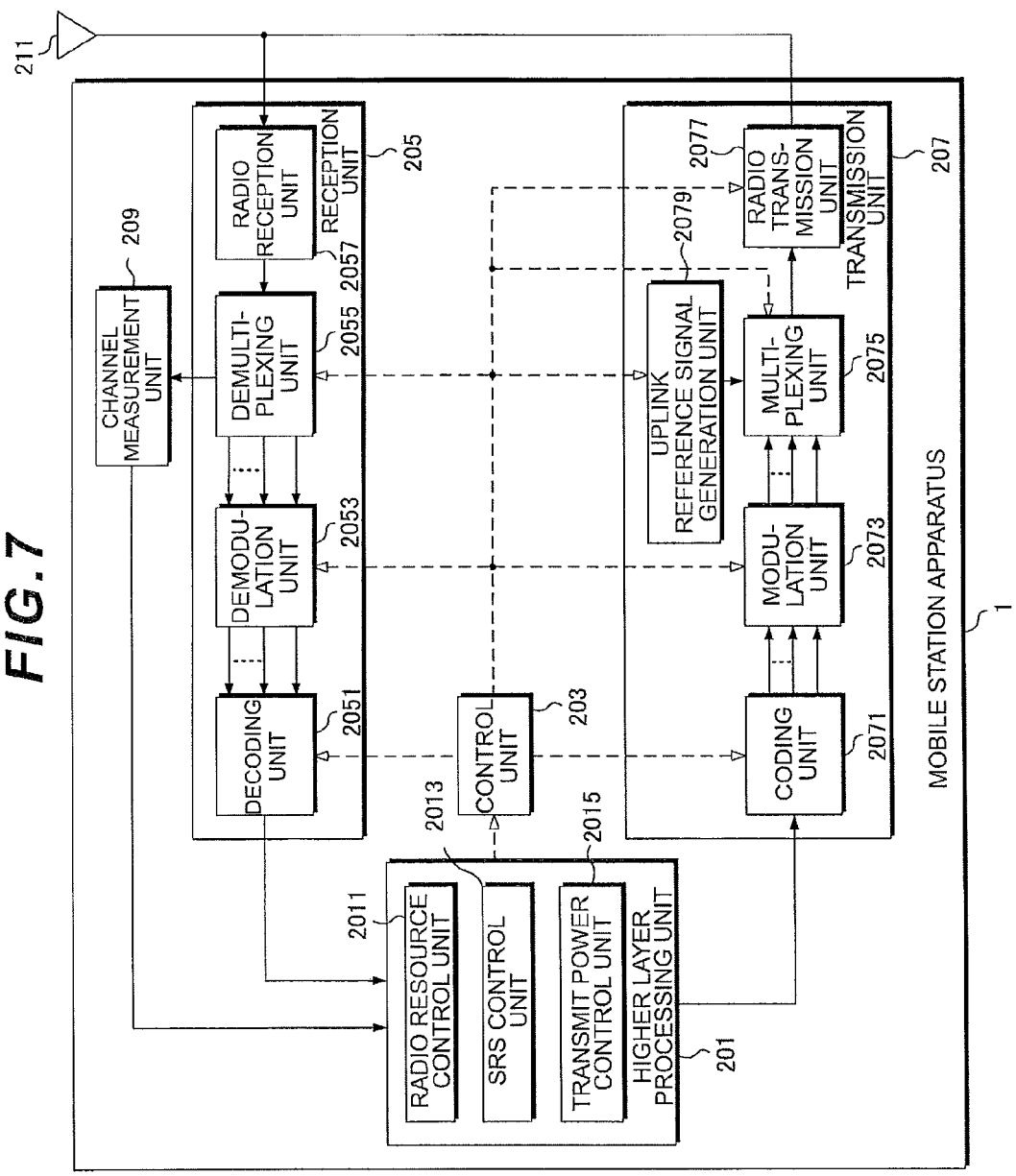
FIG. 7 is a schematic block diagram showing a configuration of a mobile station apparatus 1 of the present embodiment.

FIG. 7 is a schematic block diagram showing a configuration of the mobile station apparatus 1 according to the embodiment. As shown in the drawing, the mobile station apparatus 1 includes a higher layer processing unit 201, a control unit 203, a reception unit 205, a transmission unit 207, a channel measurement unit 209, and a transmission/reception antenna 211. In addition, the higher layer processing unit 201 includes a radio resource control unit 2011, an SRS control unit 2013, and a transmit power control unit 2015. In addition, the reception unit 205 includes a decoding unit 2051, a demodulation unit 2053, a demultiplexing unit 2055, and a radio reception unit 2057. In addition, the transmission unit 207 includes a coding unit 2071, a modulation unit 2073, a multiplexing unit 2075, and a radio transmission unit 2077.

The higher layer processing unit 201 outputs uplink data information generated by user operation etc. to the transmission unit 207. In addition, the higher layer processing unit 201 performs processing on the PDCP layer, the RLC layer, and the RRC layer.

The radio resource control unit 2011 provided in the higher layer processing unit 201 manages various setting information of the mobile station apparatus 1 itself. In addition, the radio resource control unit 2011 generates information to be assigned in each uplink channel, and outputs it to the transmission unit 207. The radio resource control unit 2011 generates control information in order to control the reception unit 205 and the transmission unit 207 based on various setting information of the mobile station apparatus 1 itself which is set by the DCI notified from the base station apparatus 3 via the PDCCH and radio resource control information notified from the base station apparatus 3 via the PDSCH, and which is managed by the radio resource control unit 2011, and outputs the control information to the control unit 203.

The SRS control unit 2013 provided in the higher layer processing unit 201 obtains from the reception unit 205 information indicating a sounding subframe, which is the subframe for the base station apparatus 3 to reserve a radio resource for transmitting an SRS broadcasted by the base station apparatus 3, and a bandwidth of a radio resource which is reserved to transmit the SRS within the sounding subframe, and information indicating the subframe and a frequency band for transmitting a periodic SRS notified from the base station apparatus 3 to the mobile station apparatus 3 itself, and the amount of cyclic shift used for the CAZAC sequence of the periodic SRS, and information indicating a frequency band for transmitting an aperiodic SRS notified from the base station apparatus 3 to the mobile station apparatus 3 itself, and the amount of cyclic shift used for a CAZAC sequence of the aperiodic SRS.

The SRS control unit 2013 controls SRS transmission in accordance with the information. Specifically, the SRS control unit 2013 controls the transmission unit 207 so as to transmit the periodic SRS once or periodically in accordance with information on the periodic SRS. In addition, when transmission of an aperiodic SRS is requested by the SRS indicator input from the transmission unit 207, the SRS control unit 2013 transmits the aperiodic SRS only a predetermined number of times (for example, once) in accordance with information on the aperiodic SRS.

The transmit power control unit 2015 provided in the higher layer processing unit 201 outputs control information to the control unit 203 so as to perform control of a transmit power on the basis of information indicating setting of transmit powers of the PUCCH, the PUSCH, the periodic SRS, and the aperiodic SRS. Specifically, the transmit power control unit 2015 controls each of the transmit power of the periodic SRS, and the transmit power of the aperiodic SRS from Formula (2) based on $P_{O\_PUSCH}$ obtained from the transmission unit 207, α, $P_{SRS\_OFFSET}(0)$ for the periodic SRS (a first parameter), $P_{SRS\_OFFSET}(1)$ for the aperiodic SRS (a second parameter), and a TPC command. It is to be noted that $P_{SRS\_OFFSET}$ switches a parameter according to the periodic SRS or the aperiodic SRS.

The control unit 203 generates a control signal which performs control of the reception unit 205 and the transmission unit 207 based on the control information from the higher layer processing unit 201. The control unit 203 outputs the generated control signal to the reception unit 205 and the transmission unit 207, and performs control of the reception unit 205 and the transmission unit 207.

The reception unit 205 separates, demodulates, and decodes the received signal received from the base station apparatus 3 through the transmission/reception antenna 211 in accordance with the control signal input from the control unit 203, and outputs the decoded information to the higher layer processing unit 201.

The radio reception unit 2057 converts (down-converts) into an intermediate frequency the downlink signal received through each reception antenna, removes an unnecessary frequency component, controls an amplification level so that a signal level is maintained appropriately, orthogonally demodulates the signal based on an in-phase component and an orthogonal component of the received signal, and converts the orthogonally demodulated analog signal into a digital signal. The radio reception unit 2057 removes a portion corresponding to a GI from the converted digital signal, performs FFT with respect to the signal from which the GI has been removed, and extracts signals of the frequency domain.

The demultiplexing unit 2055 separates the extracted signals into a PDCCH, a PDSCH, and a DL RS, respectively. It is to be noted that this separation is performed based on the radio resource allocation information notified by the DCI. In addition, the demultiplexing unit 2055 compensates a channel of the PUCCH and the PUSCH based on a channel estimate value input from the channel measurement unit 209. In addition, the demultiplexing unit 2055 outputs the separated DL RS to the channel measurement unit 209.

The demodulation unit 2053 demodulates the PDCCH in a QPSK modulation scheme, and outputs it to the decoding unit 2051. The demodulation unit 2053 performs demodulation on the PDSCH in the modulation scheme notified by the DCI, such as QPSK, 16QAM, and 64QAM, and outputs the demodulated PDSCH to the decoding unit 2051. When the decoding unit 2051 tries to decode the PDCCH to succeed in decoding, it outputs the decoded DCI to the higher layer processing unit 201. The decoding unit 2051 performs decoding on a coding rate notified by the DCI, and outputs the decoded data information to the higher layer processing unit 201.

The channel measurement unit 209 measures a downlink path loss based on the DL RS input from the demultiplexing unit 2055, and outputs the measured path loss to the higher layer processing unit 201. In addition, the channel measurement unit 209 calculates an estimate value of a downlink channel based on the DL RS, and outputs it to the demultiplexing unit 2055.

The transmission unit 207 generates a DMRS and/or an SRS in accordance with the control signal input from the control unit 203, encodes and modulates the data information input from the higher layer processing unit 201, multiplexes the PUCCH, the PUSCH, and the generated DMRS and/or SRS, adjusts the transmit powers of the PUCCH, the PUSCH, the DMRS, and the SRS, and transmits them to the base station apparatus 3 through the transmission/reception antenna.

The coding unit 2071 performs coding, such as turbo coding, convolution coding, block coding, of the UCI and the data information which have been input from the higher layer processing unit 201. The modulation unit 2073 modulates the encoded bit input from the coding unit 2071 in the modulation scheme, such as BPSK, QPSK, 16QAM, and 64QAM.

A UL RS generation unit 2079 generates a known CAZAC sequence of the base station apparatus 3 which is calculated by a rule predetermined based on a cell ID for identifying the base station apparatus 3, a bandwidth in which the DMRS and the SRS are assigned, etc. In addition, the UL RS generation unit 2079 gives a cyclic shift to the generated CAZAC sequence of the DMRS and the SRS in accordance with the control signal input from the control unit 203.

The multiplexing unit 2075 performs DFT (Discrete Fourier Transform) after rearranging the modulation symbols of the PUSCH in parallel in accordance with the control signal input from the control unit 203, and multiplexes the signals of the PUCCH and the PUSCH, and the generated DMRS and SRS.

The radio transmission unit 2077 performs IFFT on the multiplexed signal to perform modulation of an SC-FDMA system, adds a GI to the SC-FDMA-modulated SC-FDMA symbol, generates a baseband digital signal, converts the baseband digital signal into an analog signal, generates an in-phase component and an orthogonal component of an intermediate frequency from the analog signal, removes an excessive frequency component with respect to an intermediate frequency band, converts (up-converts) the intermediate frequency signal into a high-frequency signal, removes an excessive frequency component, amplifies power, and outputs the resultant signal to the transmission/reception antenna for transmission.

<Regarding Operation of Radio Communication System>

Figure 8:
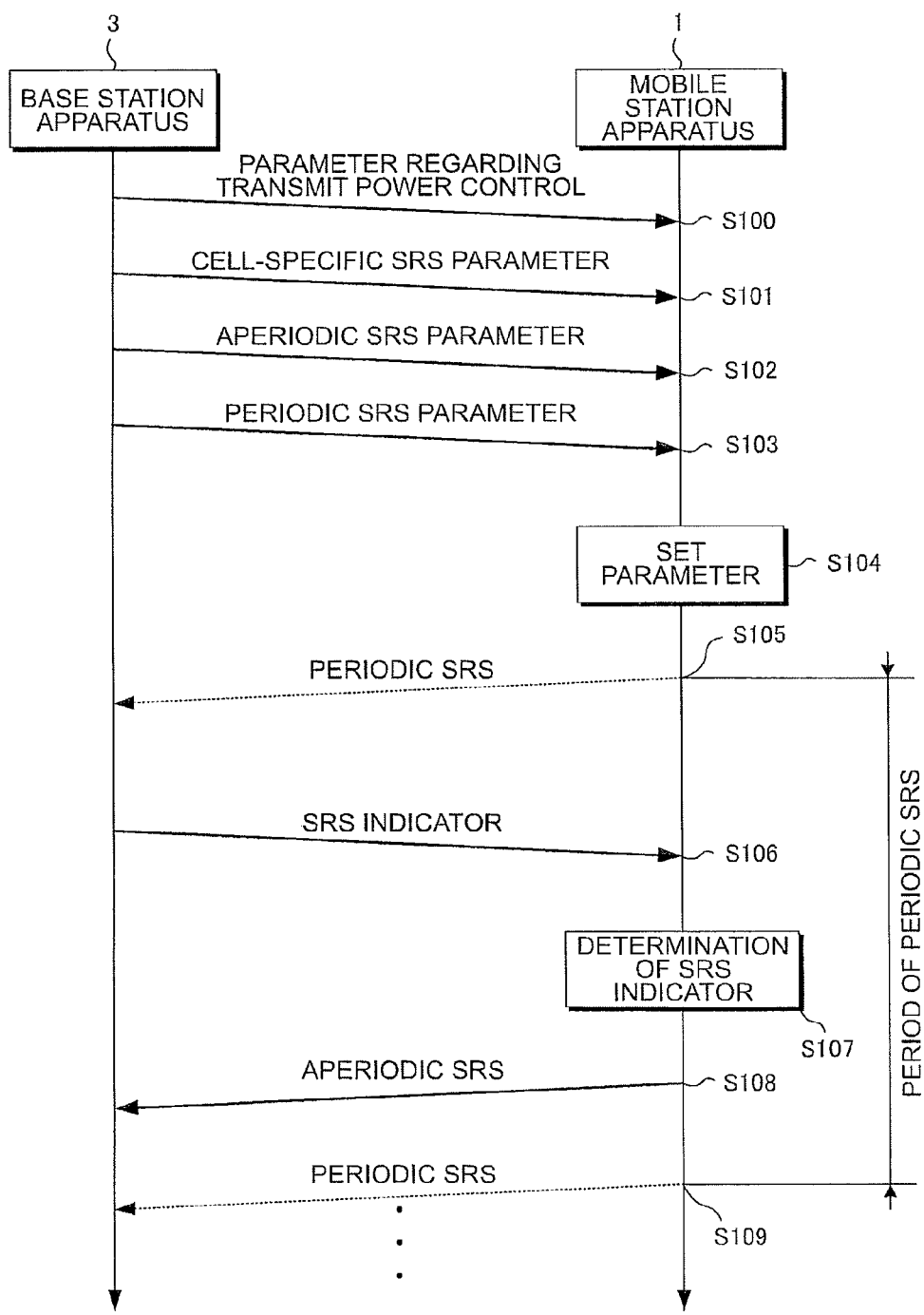
FIG. 8 is a sequence chart showing one example of operations of the mobile station apparatus 1 and the base station apparatus 3 of the present embodiment.

FIG. 8 is a sequence chart showing one example of operations of the mobile station apparatus 1 and the base station apparatus 3 of the present embodiment. The base station apparatus 3 sets $P_{O\_PUSCH}$, $\alpha$, $P_{SRS\_OFFSET}$ (0) for the periodic SRS (a first parameter), $P_{SRS\_OFFSET}$ (1) for the aperiodic SRS (a second parameter) in Formula (2), and notifies the mobile station apparatus 1 of the setting (step S100). The base station apparatus 3 sets a sounding subframe, which is the subframe for the mobile station apparatus 1 to reserve a radio resource for transmitting an SRS, and a bandwidth of the radio resource which is reserved to transmit the SRS within the sounding subframe, and notifies the mobile station apparatus 1 of the setting (step S101).

The base station apparatus 3 sets a subframe and a frequency band for transmitting a periodic SRS, and an amount of cyclic shift used for a CAZAC sequence of the periodic SRS, and notifies the mobile station apparatus 1 of the setting (step S102). The base station apparatus 3 sets a frequency band for transmitting an aperiodic SRS, and an amount of cyclic shift used for a CAZAC sequence of the aperiodic SRS, and notifies the mobile station apparatus 1 of the setting (step S103). The mobile station apparatus 1 sets parameters notified in steps S100 to S103 (step S104).

The mobile station apparatus 1 transmits the periodic SRS once or periodically in accordance with the parameter on the periodic SRS set in step S104 (step S105). It is to be noted that a transmit power of the periodic SRS is calculated using the $P_{SRS\_OFFSET}$ (0) (first parameter) for the periodic SRS notified in step S100.

The base station apparatus 3 transmits an SRS indicator indicating a request for transmission of the aperiodic SRS (step S106), and when the mobile station apparatus 1 determines that transmission of the aperiodic SRS is requested via the SRS indicator (step S107), it transmits the aperiodic SRS a predetermined number of times (for example, once) in accordance with the parameter on the aperiodic SRS set in step S104 (step S108). It is to be noted that a transmit power of the aperiodic SRS is calculated using the $P_{SRS\_OFFSET}$ (1) (second parameter) for the aperiodic SRS notified in step S100.

The mobile station apparatus 1 and the base station apparatus 3 finish processing regarding transmission and reception of the aperiodic SRS after step S108. It is to be noted that when the base station apparatus 3 has configured the mobile station apparatus 1 so as to periodically transmit the periodic SRS, the mobile station apparatus 1 continues to periodically transmit the periodic SRS also after step S108 (step S109).

Figure 9:
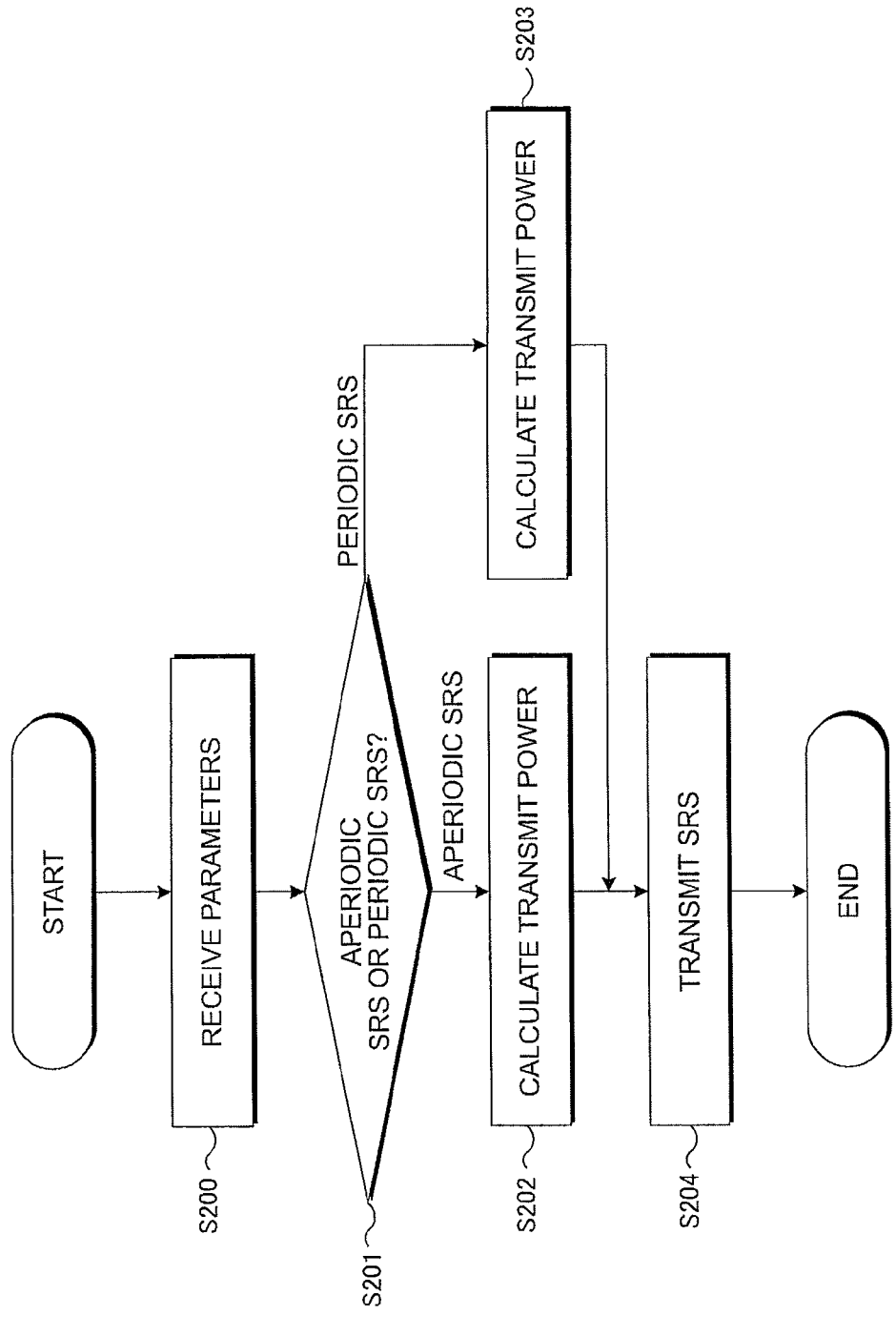
FIG. 9 is a flow chart showing one example of operations of the mobile station apparatus 1 of the present embodiment.

FIG. 9 is a flowchart showing one example of operations of the mobile station apparatus 1 of the present embodiment. The mobile station apparatus 1 receives the parameter $P_{SRS\_OFFSET}$ (0) (first parameter) regarding the transmit power of the periodic SRS and the parameter $P_{SRS\_OFFSET}$ (1) (second parameter) regarding the transmit power of the aperiodic SRS which have been transmitted by the base station apparatus 3 (step S200). When the mobile station apparatus 1 transmits the aperiodic SRS (aperiodic SRS in step S201), it calculates the transmit power of the aperiodic SRS using at least the $P_{SRS\_OFFSET}$ (1) (step S202). When the mobile station apparatus 1 transmits the periodic SRS (periodic SRS in step S201) in step S201, it calculates the transmit power of the periodic SRS using at least the $P_{SRS\_OFFSET}$ (0) (step S203).

The mobile station apparatus 1 transmits the aperiodic SRS and/or the periodic SRS with the transmit power calculated in step S202 and/or step S203 (step S204). The mobile station apparatus 1 finishes processing regarding TPC of the aperiodic SRS and/or the periodic SRS after step S204.

As described above, according to the present embodiment, the base station apparatus 3 sets to the mobile station apparatus 1 the parameter $P_{SRS\_OFFSET}$ (0) (first parameter) used for TPC of the periodic SRS transmitted by the mobile station apparatus 1 in accordance with the setting set by the base station apparatus 3 and notified to the mobile station apparatus 1, and the parameter $P_{SRS\_OFFSET}$ (1) (second parameter) used for TPC of the aperiodic SRS transmitted by the mobile station apparatus 1 when the base station apparatus 3 requests transmission using the SRS indicator, and the mobile station apparatus 1 performs TPC of the periodic SRS using at least the $P_{SRS\_OFFSET}$ (0) (first parameter) in transmitting the periodic SRS, performs TPC of the aperiodic SRS using at least the $P_{SRS\_OFFSET}$ (1) (second parameter) in transmitting the aperiodic SRS, and transmits the periodic SRS and/or the aperiodic SRS.

As a result of this, the base station apparatus 3 can set a $P_{SRS\_OFFSET}$ to each of a periodic SRS and an aperiodic SRS according to bandwidths (the number of PRBs) $M_{SRS}$ of the periodic SRS and the aperiodic SRS, etc., and can perform optimal TPC on each of the periodic SRS and the aperiodic SRS which are transmitted by the mobile station apparatus 1.

Modified Example

Hereinafter, a modified example of the present embodiment will be described. In the modified example of the present embodiment, a case will be described where the mobile station apparatus 1 includes a plurality of transmission antenna ports and the base station apparatus 3 sets a $P_{SRS\_OFFSET}$ for each transmission antenna port of the mobile station apparatus 1. In an uplink of the modified example of the present embodiment, TPC of a periodic SRS and an aperiodic SRS is performed for each transmission antenna port. Shown is a formula used to determine transmit power values of the periodic SRS and the aperiodic SRS for each transmission antenna port of the present embodiment.

[Formula 3]

$$P_{SRS}(i) + \min\{P_{CMAX}, P_{SRS\_OFFSET}(k,p) + 10\log_{10}(M_{SRS}) + P_{O\_PUSCH} + \alpha \cdot PL + f(i)\} \quad (3)$$

In Formula (3) $P_{SRS\_OFFSET}$ (k, p) is an offset indicating a difference of transmit powers as the basis of the PUSCH and that of the SRS, and is a value specified by the higher layer. k indicates the periodic SRS or the aperiodic SRS, and p indicates the transmission antenna port of the mobile station apparatus 1. For example, assume that the mobile station apparatus 1 includes two transmission antenna ports of p=0 and p=1, and assume to be k=0 in a case of the periodic SRS, and k=1 in a case of the aperiodic SRS, the base station apparatus 3 notifies the mobile station apparatus 1 of four values: a $P_{SRS\_OFFSET}$ (0, 0) with respect to the transmission antenna port of p=0 and a $P_{SRS\_OFFSET}$ (0, 1) with respect to the transmission antenna port of p=1 in transmission of the periodic SRS; and a $P_{SRS\_OFFSET}$ (1, 0) with respect to the transmission antenna port of p=0, and a $P_{SRS\_OFFSET}$ (1, 1) with respect to the transmission antenna port of p=1 in transmission of the aperiodic SRS. Since other variables of Formula (3) are the same as those of Formula (2), descriptions of the same variables are omitted.

Figure 10:
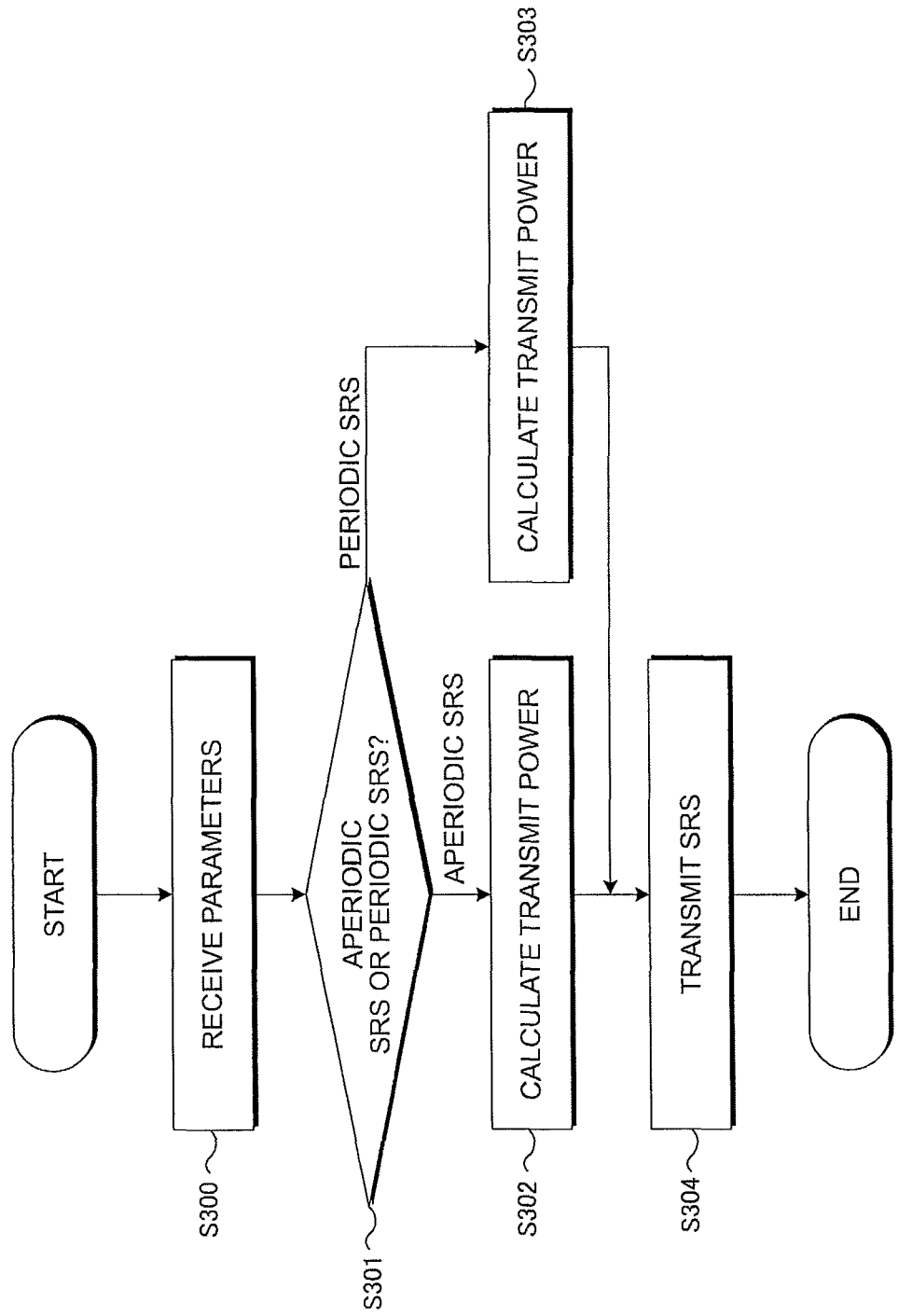
FIG. 10 is a flow chart showing one example of operations of the mobile station apparatus 1 of a modified example of the present embodiment.

FIG. 10 is a flowchart showing one example of operations of the mobile station apparatus 1 of the modified example of the present embodiment. The mobile station apparatus 1 receives a parameter $P_{SRS\_OFFSET}$ (0, p) (first parameter) for each transmission antenna port regarding the transmit power of the periodic SRS, and a parameter $P_{SRS\_OFFSET}$ (1, p) (second parameter) for each transmission antenna port regarding the transmit power of the aperiodic SRS, the parameters having been transmitted by the base station apparatus 3 (step S300). When the mobile station apparatus 1 transmits the aperiodic SRS (aperiodic SRS in step S301), it calculates the transmit power of the aperiodic SRS for each transmission antenna port using at least the $P_{SRS\_OFFSET}$(1, p) (step S302). When the mobile station apparatus 1 transmits the periodic SRS (periodic SRS in step S301) in step S301, it calculates the transmit power of the periodic SRS for each transmission antenna port using at least the $P_{SRS\_OFFSET}$(0, p) (step S303).

The mobile station apparatus 1 transmits the aperiodic SRS and/or the periodic SRS with the transmit power for each transmission antenna port calculated in step S302 and/or step S303 (step S304). The mobile station apparatus 1 finishes processing regarding TPC of the aperiodic SRS and/or the periodic SRS after step S304.

According to the modified example of the present embodiment as described above, the base station apparatus 3 sets a $P_{SRS\_OFFSET}$ (k, p) to each of the plurality of transmission antenna ports provided in the mobile station apparatus 1, and the mobile station apparatus 1 performs TPC of the periodic SRS and the aperiodic SRS using at least the $P_{SRS\_OFFSET}$ (k, p) for each transmission antenna port in transmitting the periodic SRS and/or the aperiodic SRS. As a result of this, the mobile station apparatus 1 can perform control so as to increase a transmit power of a transmission antenna port with a high priority (for example, a transmission antenna port transmitting a signal), and decrease a transmit power of a transmission antenna port with a low priority (for example, a transmission antenna port not transmitting a signal), thus enabling to perform flexible control of a transmit power according to a priority of the transmission antenna port.

It is to be noted that although the $P_{SRS\_OFFSET}$ (0) for the periodic SRS (first parameter), and the $P_{SRS\_OFFSET}$ (1) for the aperiodic SRS (second parameter) are transmitted and received as parameters regarding TPC in step S100 in FIG. 8 in the present embodiment, the $P_{SRS\_OFFSET}$ (0) (first parameter) for periodic SRS may be transmitted together with the parameter regarding the periodic SRS in step S103, or the $P_{SRS\_OFFSET}$ (1) (second parameter) for aperiodic SRS may be transmitted together with the parameter regarding the aperiodic SRS in step S102, or the $P_{SRS\_OFFSET}$ (0) (first parameter) and the $P_{SRS\_OFFSET}$ (1) (second parameter) may be transmitted together with any other parameters.

In addition, although in the present embodiment, the base station apparatus 3 transmits the SRS indicator which requests the aperiodic SRS using the PDCCH when requesting aperiodic SRS transmission from the mobile station apparatus 1, a transmission method of the SRS indicator is not limited to this, and the SRS indicator may be transmitted by a radio resource control signal, MAC (Medium Access Control), a CE (Control Element), etc.

In addition, in the modified example of the present embodiment, the mobile station apparatus 1 notifies the base station apparatus 3 of the number of transmission antenna ports of the mobile station apparatus 1 itself, and thereby the base station apparatus 3 may be enabled to discriminate the number of transmission antenna ports of the mobile station apparatus 1.

Characteristic means of the present invention described above can be achieved also by mounting the means on an integrated circuit and controlling them. Namely, an integrated circuit of the present invention is the integrated circuit applied to a radio communication system having the base station apparatus 3 and the mobile station apparatus 1 which transmits a first reference signal for uplink channel measurement at a timing set by the base station apparatus 3, and which transmits a second reference signal for the uplink channel measurement only the specific number of times when transmission is requested by the base station apparatus 3, and the integrated circuit is characterized by having: in the base station apparatus 3, means which sets a first parameter used for TPC of the first reference signal and a second parameter used for TPC of the second reference signal; and means which notifies the mobile station apparatus of the first parameter and the second parameter; and in the mobile station apparatus 1, means which performs TPC of the first reference signal using at least the first parameter in transmitting the first reference signal, and which performs TPC of the second reference signal using at least the second parameter in transmitting the second reference signal; and means which transmits the first reference signal and/or the second reference signal.

As described above, in the radio communication system using the integrated circuit of the present invention, the base station apparatus 3 can set a $P_{SRS\_OFFSET}$ to each of a periodic SRS and an aperiodic SRS according to bandwidths (the number of PRBs) $M_{SRS}$ of the periodic SRS and the aperiodic SRS, etc., and can perform optimal TPC to each of the periodic SRS and the aperiodic SRS transmitted by the mobile station apparatus 1.

In addition, the integrated circuit of the present invention is characterized by having: in the base station apparatus 3, means which sets a first parameter and a second parameter to each of a plurality of transmission antenna ports provided in the mobile station apparatus 1; and in the mobile station apparatus 1, means which performs TPC of the first reference signal using at least the first parameter for each transmission antenna port in transmitting the first reference signal, and which performs TPC of the second reference signal using at least the second parameter for each transmission antenna port in transmitting the second reference signal.

As described above, in the radio communication system using the integrated circuit of the present invention, the base station apparatus 3 can perform control so as to increase a transmit power of a transmission antenna port with a high priority (for example, a transmission antenna port transmitting a signal) of the mobile station apparatus 1, and decrease a transmit power of a transmission antenna port with a low priority (for example, a transmission antenna port not transmitting a signal) thereof, thus enabling to perform flexible control of a transmit power according to a priority of the transmission antenna port.

A program that operates in the base station apparatus 3 and the mobile station apparatus 1 according to the present invention may be the program (program causing a computer to operate) that controls a CPU (Central Processing Unit) etc. so as to achieve a function in the above-mentioned embodiment according to the present invention. Additionally, information dealt with in these apparatuses is temporarily stored in RAM (Random Access Memory) at the time of processing thereof, subsequently stored in various ROMs, such as a Flash ROM (Read Only Memory), and a HDD (Hard Disk Drive), and the information is read, corrected/written by the CPU if needed.

It is to be noted that part of the mobile station apparatus 1 and the base station apparatus 3 in the above-mentioned embodiment may be achieved with a computer. In that case, the part of the apparatus may be achieved by recording a program for achieving the above-described control function in a computer-readable recording medium, and causing a computer system to read the program recorded in this recording medium and execute it. It is to be noted that a "computer system" referred to herein shall be the computer system incorporated in the mobile station apparatus 1 or the base station apparatus 3, and shall include hardware, such as an OS and a peripheral device.

In addition, a "computer-readable recording medium" means a portable medium, such as a flexible disk, a magnetic optical disk, a ROM, and a CD-ROM, and a memory storage incorporated in the computer system, such as a hard disk. Further, the "computer-readable recording medium" may also include a medium that dynamically holds a program for a short time, and a medium that holds a program for a certain time as a volatile memory inside the computer system serving as a server or a client when the program is dynamically held for the short time as a communication wire used when the program is transmitted through a communication line, such as a network like the Internet, and a telephone line. In addition, the above-described program may be the program for achieving a part of the above-mentioned functions and further, it may be the program in which the above-mentioned functions can be achieved in combination with the program having been already recorded in the computer system.

In addition, part or all of the mobile station apparatus 1 and the base station apparatus 3 in the above-mentioned embodiment may be achieved as an LSI, which typically is an integrated circuit. Each functional block of the mobile station apparatus 1 and the base station apparatus 3 may be individually formed into chips, or part or all of the functional blocks may be integrated to form a chip. In addition, a technique for making the functional blocks into an integrated circuit may be achieved not only as the LSI but as a dedicated circuit or a general-purpose processor. In addition, when a technology for making the functional blocks into the integrated circuit as an alternative to the LSI appears due to progress of a semiconductor technology, it is also possible to use an integrated circuit made by the technology.

As described above, although one embodiment of the present invention has been described in detail with reference to the drawings, a specific configuration is not limited to the above, and various changes of a design etc. can be made without departing from the scope of the present invention.

DESCRIPTION OF SYMBOLS

1 (1A to 1C) mobile station apparatus
3 base station apparatus
101 higher layer processing unit (base station side higher layer processing unit)
103 control unit
105 reception unit (base station side reception unit)
107 transmission unit (base station side transmission unit)
109 channel measurement unit
111 transmission/reception antenna
201 higher layer processing unit (mobile station side higher layer processing unit)
203 control unit
205 reception unit (mobile station side reception unit)
207 transmission unit (mobile station side transmission unit)
209 channel measurement unit
211 transmission/reception antenna
1011 radio resource control unit
1013 SRS setting unit
1015 transmit power setting unit
1051 decoding unit
1053 demodulation unit
1055 demultiplexing unit
1057 radio reception unit
1071 coding unit
1073 modulation unit
1075 multiplexing unit
1077 radio transmission unit
1079 uplink reference signal generation unit
2011 radio resource control unit
2013 SRS control unit
2015 transmit power control unit
2051 decoding unit
2053 demodulation unit
2055 demultiplexing unit
2057 radio reception unit
2071 coding unit
2073 modulation unit
2075 multiplexing unit
2077 radio transmission unit
2079 uplink reference signal generation unit

The invention claimed is:

1. A mobile station apparatus comprising:
a receiver configured to and/or programmed to receive a radio resource control signal including at least a first parameter $P_{OFFSET}(0)$ and a second parameter $P_{OFFSET}(1)$,
a transmitter configured to and/or programmed to transmit a first reference signal on a first antenna port and a second reference signal on a second antenna port, and a control circuit configured to and/or programmed to:
set a first transmit power for a transmission of the first reference signal based on at least the first parameter $P_{OFFSET}(0)$, a maximum transmit power value, a path loss and a transmission power control command; and
set a second transmit power for a transmission of the second reference signal based on at least the second parameter $P_{OFFSET}(1)$, a maximum transmit power value, a path loss and a transmission power control command.

2. The mobile station apparatus according to claim 1, wherein
the transmission of the first reference signal is triggered based on higher layer signaling, and
the transmission of the second reference signal corresponds to a detection of a physical downlink channel with downlink information.

3. A base station apparatus comprising:
a transmitter configured to and/or programmed to transmit a radio resource control signal including at least a first parameter $P_{OFFSET}(0)$ and a second parameter $P_{OFFSET}(1)$,
a receiver configured to and/or programmed to receive a first reference signal on a first antenna port and a second reference signal on a second antenna port, wherein
the first reference signal is transmitted with a first transmit power based on at least the first parameter $P_{OFFSET}(0)$, a maximum transmit power value, a path loss and a transmission power control command; and
the second reference signal is transmitted with a second transmit power based on at least the second parameter $P_{OFFSET}(1)$, a maximum transmit power value, a path loss and a transmission power control command.

4. The base station apparatus according to claim 3, wherein
the transmission of the first reference signal is triggered based on higher layer signaling, and
the transmission of the second reference signal corresponds to a detection of a physical downlink channel with downlink information.

5. A radio communication method used for a mobile station apparatus comprising:
receiving a radio resource control signal including at least a first parameter $P_{OFFSET}(0)$ and a second parameter $P_{OFFSET}(1)$,
transmitting a first reference signal on a first antenna port and a second reference signal on a second antenna port, and
setting a first transmit power for a transmission of the first reference signal based on at least the first parameter $P_{OFFSET}(0)$, a maximum transmit power value, a path loss and a transmission power control command; and
setting a second transmit power for a transmission of the second reference signal based on at least the second parameter $P_{OFFSET}(1)$, a maximum transmit power value, a path loss and a transmission power control command.

6. The radio communication method according to claim 5, wherein
the transmission of the first reference signal is triggered based on higher layer signaling, and
the transmission of the second reference signal corresponds to a detection of a physical downlink channel with downlink information.

7. A radio communication method used for a base station apparatus comprising:
transmitting a radio resource control signal including at least a first parameter $P_{OFFSET}(0)$ and a second parameter $P_{OFFSET}(1)$,
receiving a first reference signal on a first antenna port and a second reference signal on a second antenna port, wherein
the first reference signal is transmitted with a first transmit power based on at least the first parameter $P_{OFFSET}(0)$, a maximum transmit power value, a path loss and a transmission power control command; and
the second reference signal is transmitted with a second transmit power based on at least the second parameter $P_{OFFSET}(1)$, a maximum transmit power value, a path loss and a transmission power control command.

8. The radio communication method according to claim 7, wherein
the transmission of the first reference signal is triggered based on higher layer signaling, and
the transmission of the second reference signal corresponds to a detection of a physical downlink channel with downlink information.

* * * * *